US007497916B2

(12) United States Patent
Hayashi et al.

(10) Patent No.: US 7,497,916 B2
(45) Date of Patent: Mar. 3, 2009

(54) METHOD OF MANUFACTURING MULTILAYER OPTICAL INFORMATION RECORDING MEDIUM

(75) Inventors: Kazuhiro Hayashi, Osaka (JP); Kazuya Hisada, Osaka (JP); Eiji Ohno, Osaka (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 10/486,764

(22) PCT Filed: Feb. 26, 2003

(86) PCT No.: PCT/JP03/02098

§ 371 (c)(1),
(2), (4) Date: Aug. 12, 2004

(87) PCT Pub. No.: WO03/081584

PCT Pub. Date: Oct. 2, 2003

(65) Prior Publication Data

US 2004/0264359 A1    Dec. 30, 2004

(30) Foreign Application Priority Data

Mar. 27, 2002    (JP) ............................. 2002-087841

(51) Int. Cl.
*B32B 37/00* (2006.01)
*B29C 39/44* (2006.01)

(52) U.S. Cl. .................. 156/64; 156/150; 156/232; 156/245; 156/275.5; 156/378; 156/500; 264/40.1; 264/219; 264/259; 264/334; 425/127; 425/169; 425/175; 425/444

(58) Field of Classification Search .............. 156/150, 156/232, 245, 275.5, 275.7, 379.8, 500, 581, 156/64; 264/259, 40.1, 219, 334, 335; 425/174.4, 425/552, 406, 411, 127, 169, 175, 437, 444
See application file for complete search history.

(56) References Cited

U.S. PATENT DOCUMENTS 4,957,776 A    9/1990    Higuchi et al.
5,078,947 A    1/1992    Nishizawa et al.

(Continued)

FOREIGN PATENT DOCUMENTS

EP    1 043 058 A1    10/2000

(Continued)

OTHER PUBLICATIONS

International Search Report for International Application No. PCT/JP03/02098, issued Jun. 24, 2003 with English translation Form PCT/ISA/210.

*Primary Examiner*—Richard Crispino
*Assistant Examiner*—Michael A Tolin
(74) *Attorney, Agent, or Firm*—RatnerPrestia

(57) ABSTRACT

When a separation layer is formed using a stamper between a substrate and the stamper on a thick substrate, on the surface of which a rewritable recording multilayer film provided with signal guide grooves or pits and the signal guide grooves or pits are transferred from the stamper to the surface, variations in the thickness of the separation layer are produced due to unevenness of the distance between the stamper and the substrate.

The surface of the kth signal recording layer of the kth signal substrate is shaped parallel to the surface with the guide grooves and pits of the (k−1)th signal recording layer on the (k−1)th stamper, a (k−1)th separation layer is formed between the two and then the (k−1)th stamper is peeled off. The distance between the surface with the guide grooves and pits of the (k−1)th signal recording layer and the kth signal recording layer becomes uniform, and therefore the thickness of the (k−1)th separation layer can be kept uniform.

42 Claims, 16 Drawing Sheets

U.S. PATENT DOCUMENTS

| | | | |
|---|---|---|---|
| 5,126,996 A | 6/1992 | Iida et al. | |
| 5,708,652 A | 1/1998 | Ohki et al. | |
| 5,932,042 A * | 8/1999 | Gensel et al. | 156/74 |
| 6,210,609 B1 * | 4/2001 | Takeda et al. | 264/1.33 |
| 6,270,611 B1 | 8/2001 | Ohki et al. | |
| 6,312,547 B1 | 11/2001 | Fujimori et al. | |
| 6,478,069 B1 | 11/2002 | Fujisaku et al. | |
| 2002/0048256 A1 | 4/2002 | Yamasaki et al. | |

FOREIGN PATENT DOCUMENTS

| | | |
|---|---|---|
| JP | 1-182944 A | 7/1989 |
| JP | 2-223030 A | 9/1990 |
| JP | 3-237636 A | 10/1991 |
| JP | 5-59615 | 8/1993 |
| JP | 8-115537 A | 5/1996 |
| JP | 8-235644 A | 9/1996 |
| JP | 2570402 | 10/1996 |
| JP | 09-027149 | 1/1997 |
| JP | 9-063112 | 3/1997 |
| JP | 9-063134 | 3/1997 |
| JP | 9-115191 A | 5/1997 |
| JP | 10-172186 | 6/1998 |
| JP | 10-222870 A | 8/1998 |
| JP | 10-283682 | 10/1998 |
| JP | 11-31337 A | 2/1999 |
| JP | 2000-235733 A | 8/2000 |
| JP | 2000-268417 A | 9/2000 |
| JP | 2000-288345 | 10/2000 |
| JP | 2000-353338 A | 12/2000 |
| JP | 2001-052378 A | 2/2001 |
| JP | 2001-334534 | * 12/2001 |
| JP | 2001-334534 A | 12/2001 |
| JP | 2001-357571 | 12/2001 |
| JP | 2002-025111 A | 1/2002 |
| JP | 2002-42379 A | 2/2002 |
| JP | 2002-260307 | 9/2002 |
| WO | WO 00/72318 | 11/2000 |

* cited by examiner

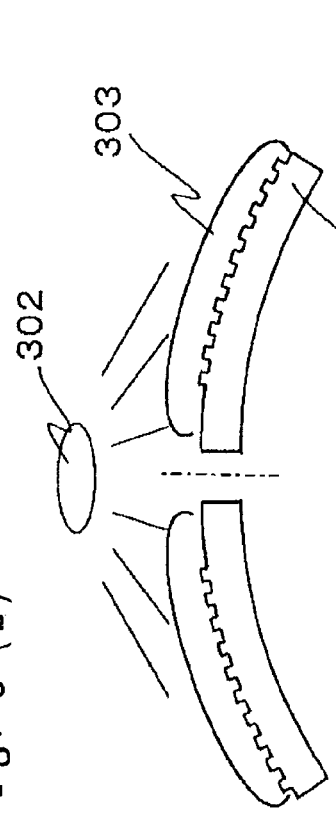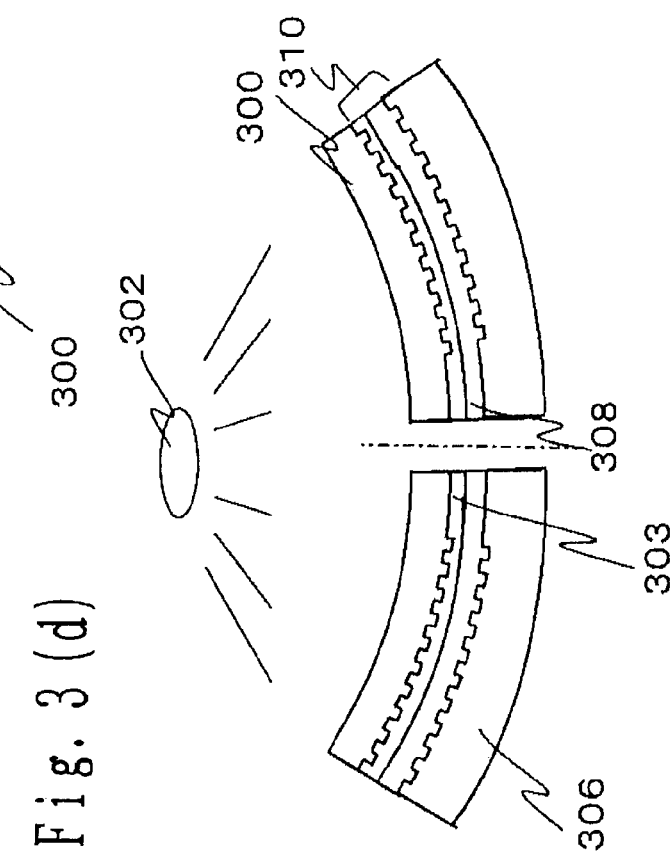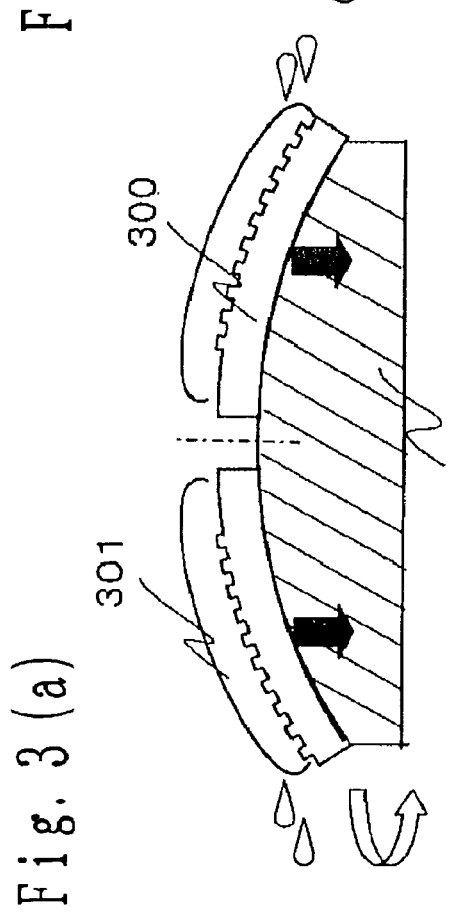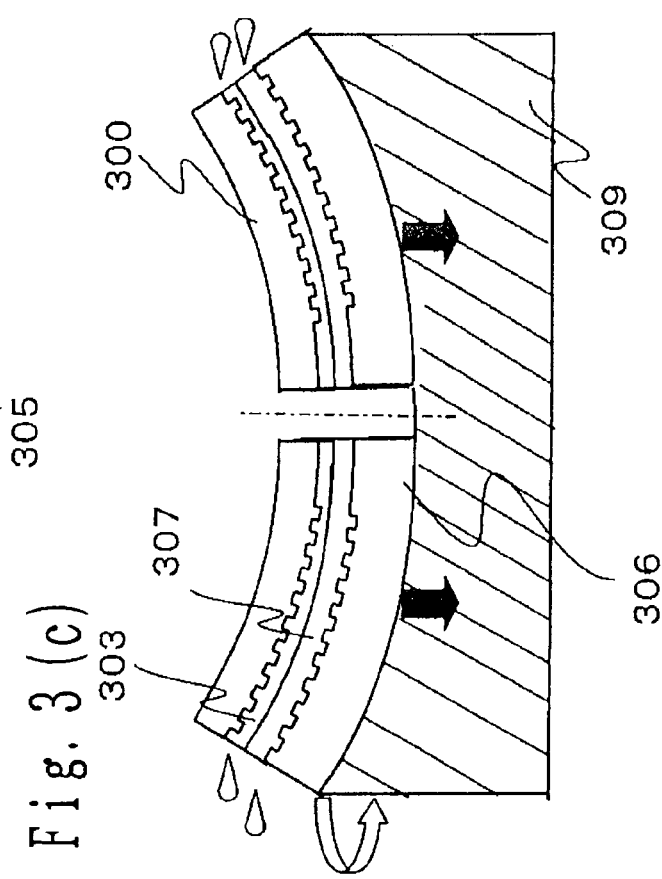

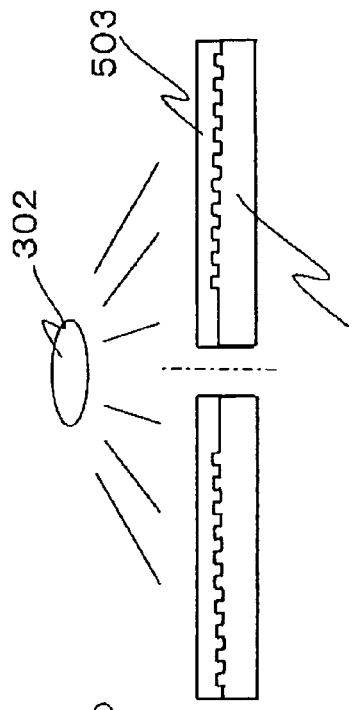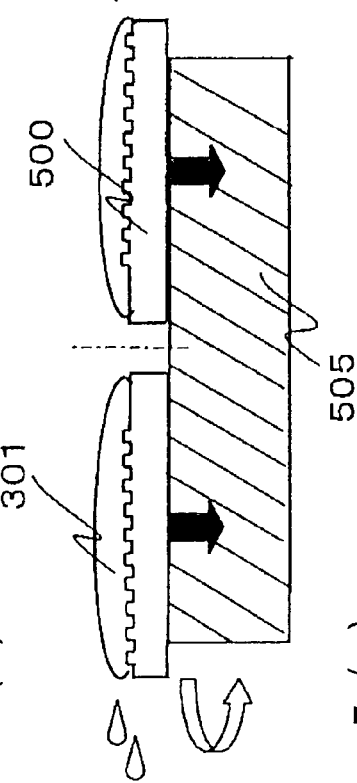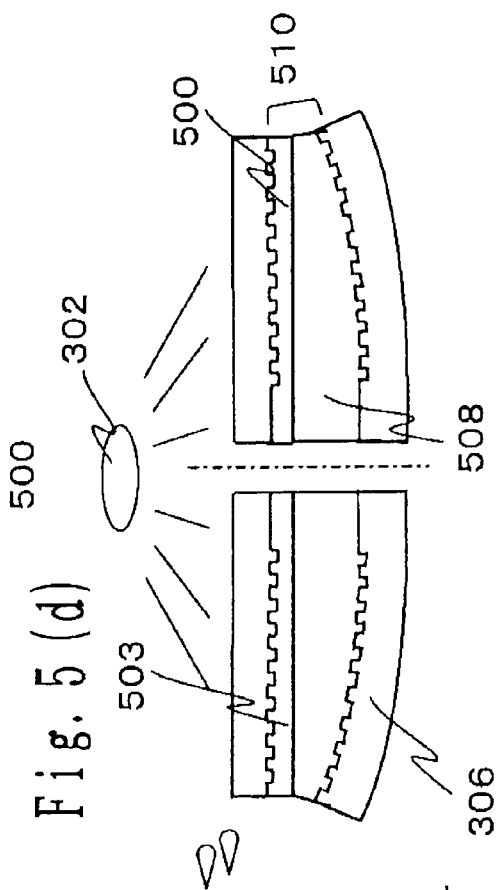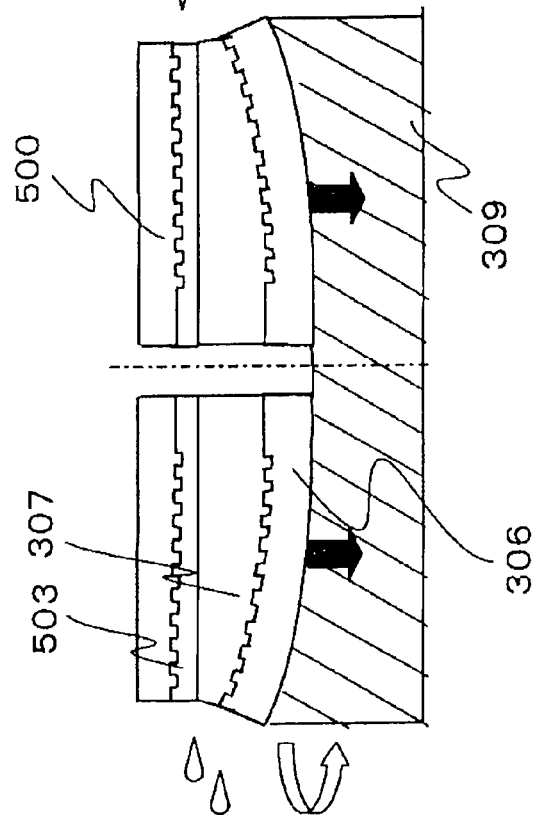
Fig. 5 (a)  Fig. 5 (b)  Fig. 5 (c)  Fig. 5 (d)

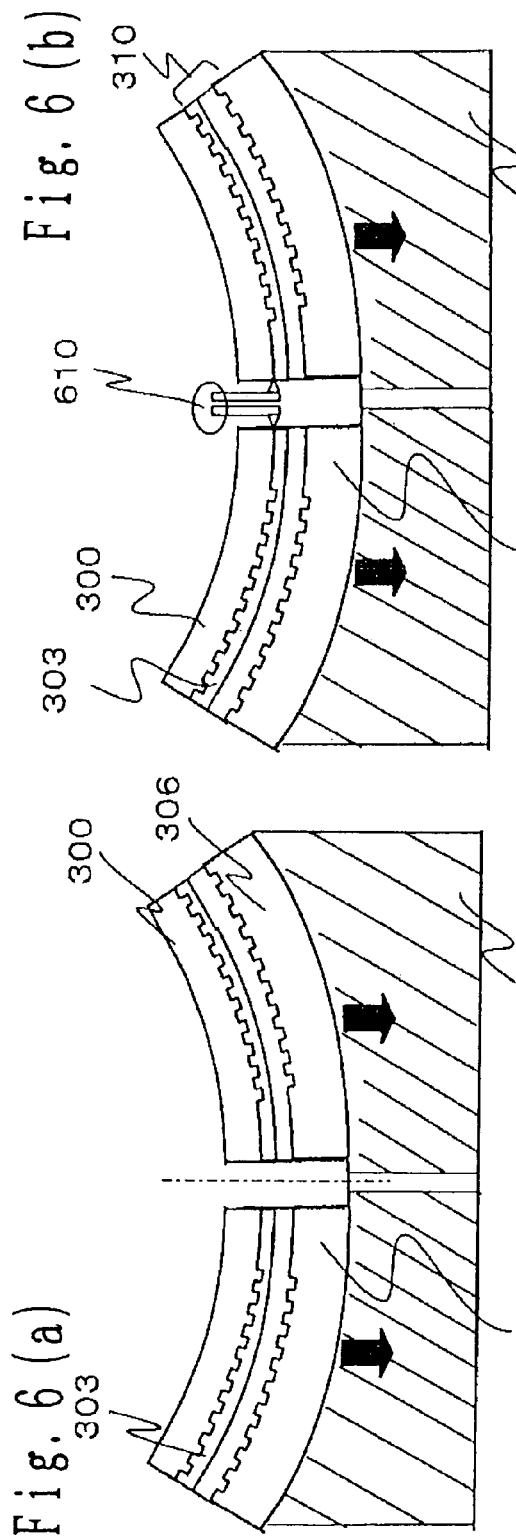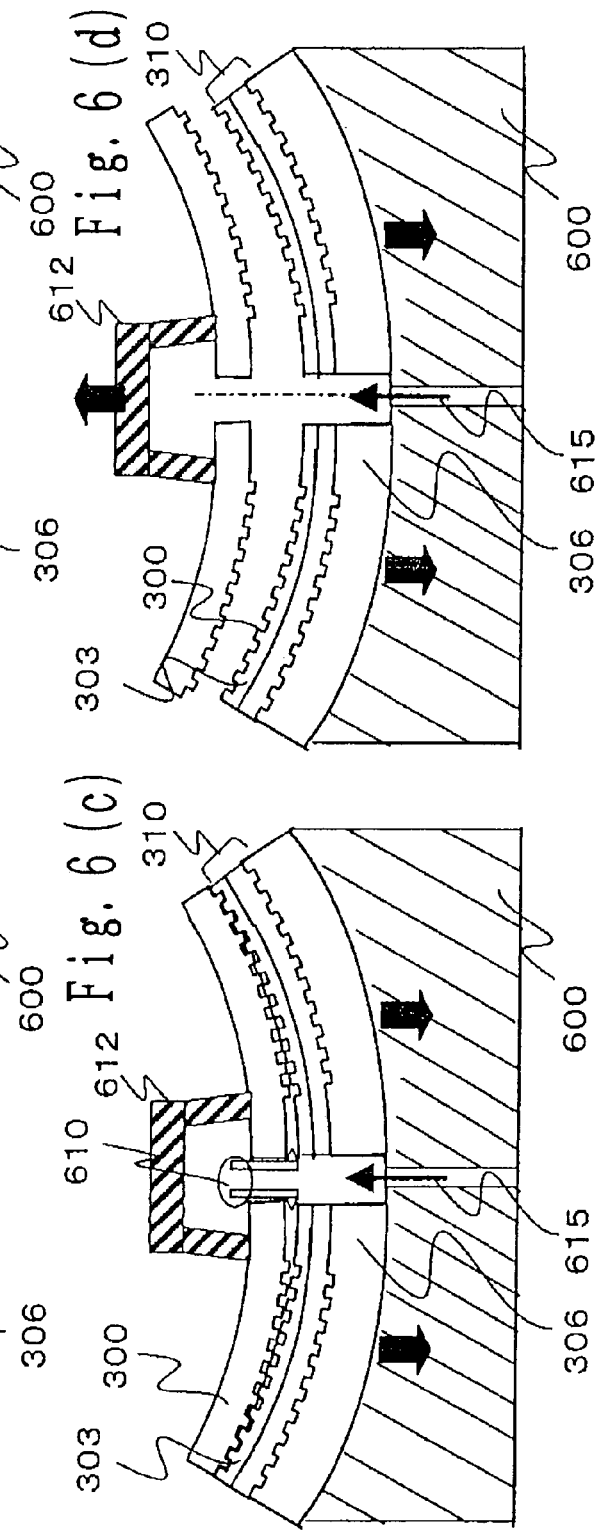

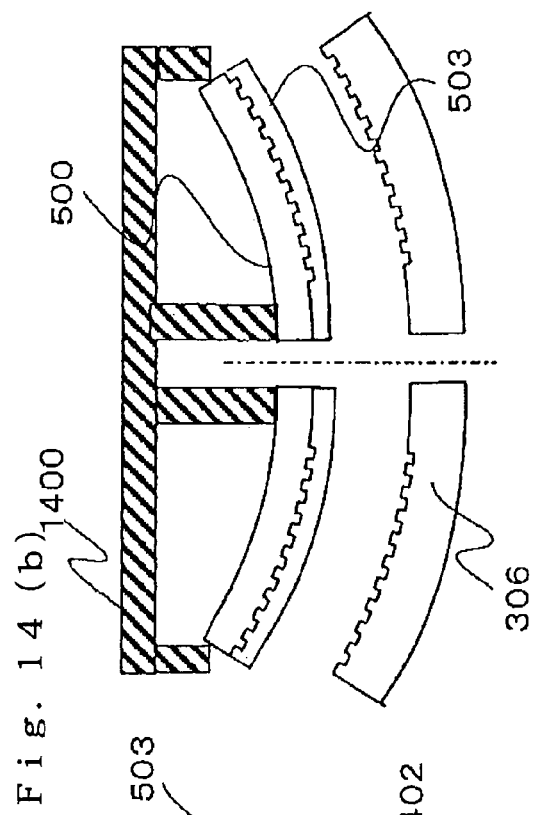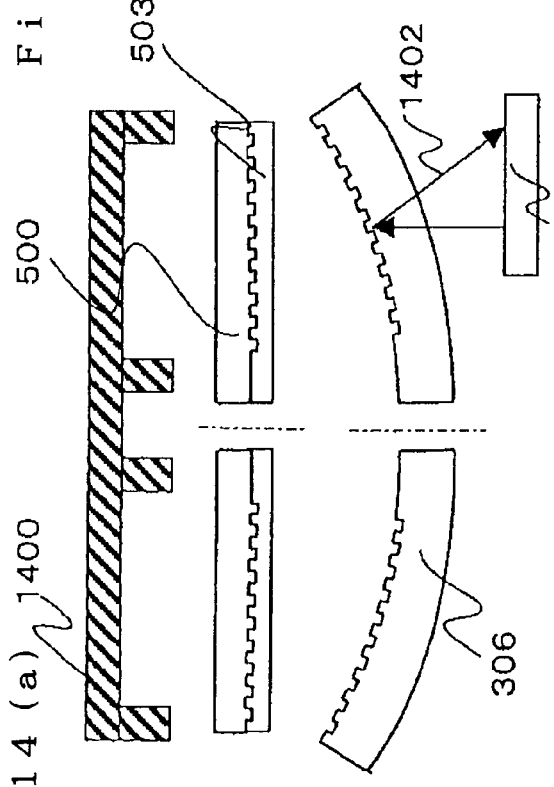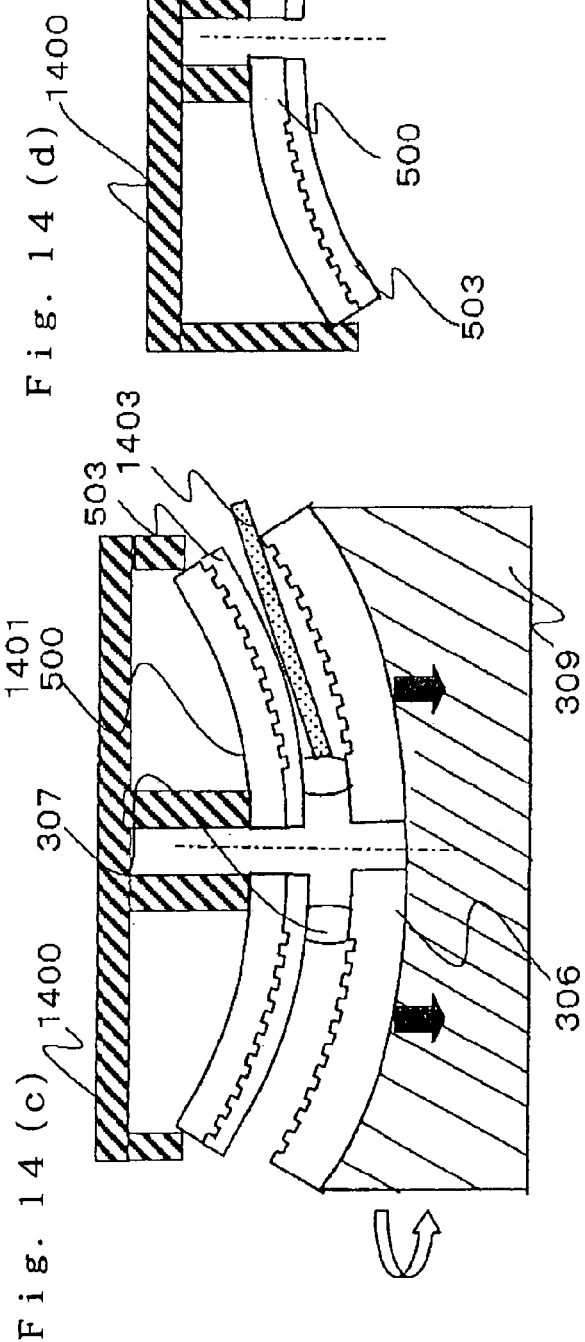
Fig. 14 (a), Fig. 14 (b), Fig. 14 (c), Fig. 14 (d)

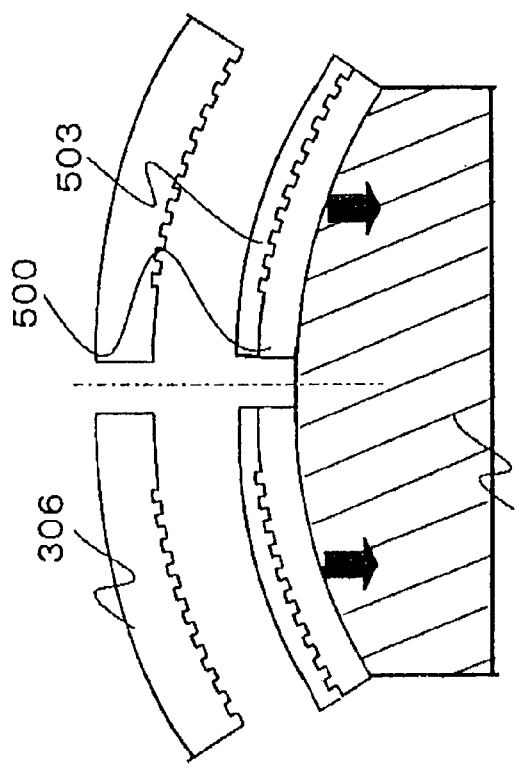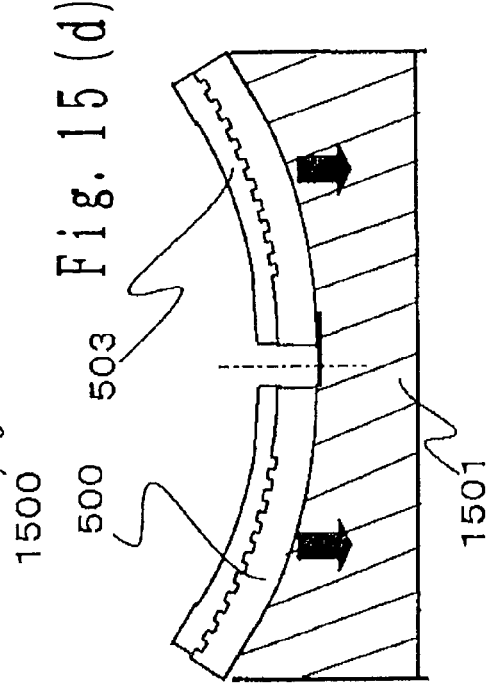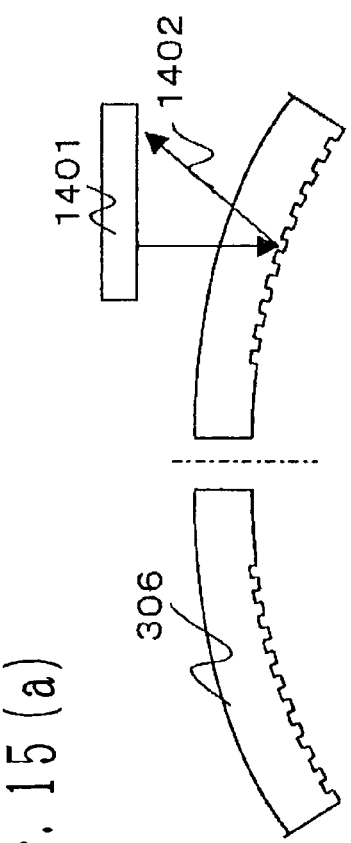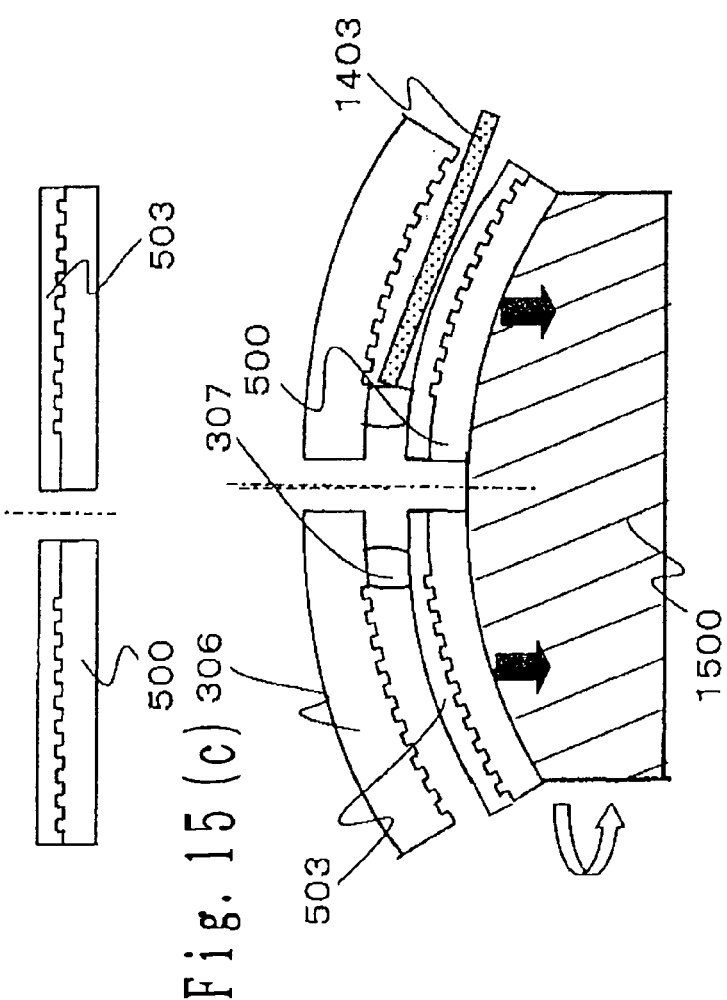
Fig. 15 (a)  Fig. 15 (b)  Fig. 15 (c)  Fig. 15 (d)

METHOD OF MANUFACTURING MULTILAYER OPTICAL INFORMATION RECORDING MEDIUM

This application is a U.S. National Phase Application of PCT Application No. PCT/JP03/02098, filed Feb. 26, 2003.

TECHNICAL FIELD

The present invention relates to a method of manufacturing a multilayer optical information recording medium which has n (n: 2 or more) signal recording layers with a separation layer inserted between the respective signal recording layers, one side of which is used to record or reproduce information.

BACKGROUND ART

As a high density optical information recording medium, there is a proposal of a multilayer optical information recording medium having a plurality of signal recording layers in the thickness direction such as a DVD provided with two layers for reproduction on one side. A DVD provided with two layers for reproduction on one side, for example, has a structure with two substrates, one having an information recording surface on which a translucent reflecting layer of gold or silicon, etc., is formed and the other having an information recording surface on which a conventional reflecting layer made of aluminum, etc., is formed and the two substrates are pasted together in such a way that these information recording surfaces come inside facing each other. To further improve surface recording density per one layer, there is a proposal of a high density optical information recording medium having a violet laser light source (with a wavelength of approximately 400 nm), a lens of high NA and a 0.1 mm thick low-profile transparent cover layer on the recording/reproducing side. This high density optical information recording medium has a structure with signal guide grooves or pits formed on the surface of a thick signal substrate, a rewritable recording multilayer film formed thereon and a transparent cover layer further formed thereon.

For this low-profile transparent cover layer type high density optical information recording medium, there can also be one with two signal recording surfaces. One example of the method of manufacturing it will be shown below.

(1) On a thick substrate on which a rewritable recording multilayer film with signal guide grooves or pits formed on the surface is formed, a separation layer is further formed using UV cure resin and a second layer with signal guide grooves or pits is formed on the surface of the separation layer.

(2) A rewritable translucent recording multilayer film is formed on the second layer with signal guide grooves or pits.

(3) A low-profile recording/reproducing side transparent cover layer of 0.1 mm in thickness is formed.

An example of specific methods of manufacturing this is the one described in Japanese Patent Laid-Open No. 2002-260307. The entire disclosure of Japanese Patent Laid-Open No. 2002-260307 is incorporated herein by reference in its entirety. That is, according to the method of Japanese Patent Laid-Open No. 2002-260307, using a plastic stamper for the step in (1) above, UV cure resin is applied to signal guide grooves or pits on the stamper, which are thereby cured, then this is pasted to the substrate on which the first recording multilayer film is formed using other UV cure resin having a different nature and the stamper is peeled off after the cure. Using such a method makes it possible to create a multilayer optical information recording medium using a rigid thick substrate as the base and placing one or a plurality of signal recording layers on top of the base through a separation layer.

However, the separation layer lying between the signal recording layers of the multilayer optical information recording medium must be uniform. When the separation layer is uniform, influences of reflected light from the other layer during recording or reproduction become constant in the signal recording layers before and after the separation layer. When the reflected light from the other signal recording layer fluctuates, this becomes a disturbance component of the reproduced signal and deteriorates S/N. On the contrary, when the separation layer is uniform, disturbance from the other signal recording layer is constant, which stabilizes recording or reproduction and improves the quality of the reproduced signal. In practice, however, variations in the thickness of the separation layer are produced when on a thick substrate on which a rewritable recording multilayer film with a surface provided with guide grooves or pits is formed, a stamper is used to transfer the separation layer between the substrate and stamper and the signal guide grooves or pits from the stamper onto the surface.

DISCLOSURE OF THE INVENTION

In view of the above described problems, it is an object of the present invention to provide a method of manufacturing a multilayer optical information recording medium capable of providing a uniform separation layer between two signal recording layers.

To solve the above-described problems, a first aspect of the present invention is a method of manufacturing a multilayer optical information recording medium having n (n is an integer not smaller than 2) signal recording layers and a separation layer between the respective signal recording layers, assuming that the kth (k is an integer not smaller than 2 and not greater than n) signal recording layer from the recording surface or reproducing surface is a kth signal recording layer, the substrate having said kth signal recording layer on its surface is a kth signal substrate, the stamper having guide grooves and/or pits of the (k−1)th signal recording layer is a (k−1)th stamper and the separation layer between the kth signal recording layer and said (k−1)th signal recording layer is the (k−1)th separation layer, said method of manufacturing the multilayer optical information recording medium comprising:

a measuring step of measuring surface shapes of one or a plurality of said kth signal substrates manufactured currently or in the past;

a signal recording layer forming step of shaping the surface with guide grooves and/or pits of said (k−1)th signal recording layer of said (k−1)th stamper so as to correspond to the surface shape of said kth signal-substrate and forming said (k−1)th signal recording layer using the (k−1)th stamper; and a peeling step of peeling off said (k−1)th stamper from the interface between said (k−1)th separation layer and said (k−1)th stamper, wherein at least one of said n signal recording layers is created in said signal recording layer forming step.

According to the above described method of manufacturing the multilayer optical information recording medium of the present invention, the (k−1)th stamper and the kth signal substrate are shaped parallel to each other, and therefore the distance between the two becomes uniform and the thickness of the (k−1)th separation layer created also becomes uniform.

A second aspect of the present invention is the method of manufacturing the multilayer optical information recording medium according to the first aspect of the present invention, wherein when said kth signal substrate is warped so as to wrap around said kth signal recording layer, in said signal recording layer forming step, said (k−1)th stamper is warped so as to wrap around the surface opposite to the surface with guide grooves and/or pits of said (k−1)th signal recording layer.

According to the above described configuration, the distance between the kth signal recording layer and the surface having the guide grooves or pits or the guide grooves and pits of the (k−1)th signal recording layer becomes substantially uniform without changing the warpage of the kth signal substrate, and therefore the thickness of the manufactured (k−1)th separation layer becomes uniform.

A third aspect of the present invention is the method of manufacturing the multilayer optical information recording medium according to the first aspect of the present invention, wherein when said kth signal substrate is warped so as to wrap around the opposite surface of the kth signal recording layer, in said signal recording layer forming step, said (k−1)th stamper is warped so as to wrap around the surface with guide grooves and/or pits of said (k−1)th signal recording layer.

According to the above described configuration, the distance between the kth signal recording layer and the surface having the guide grooves or pits or the guide grooves and pits of the (k−1)th signal recording layer becomes substantially uniform without changing the warpage of the kth signal substrate, and therefore the thickness of the manufactured (k−1)th separation layer becomes uniform.

A fourth aspect of the present invention is the method of manufacturing the multilayer optical information recording medium according to the second or the third aspect of the present invention, wherein in said signal recording layer forming step, the kth signal recording layer of said kth signal substrate and the surface with guide grooves and/or pits of said (k−1)th signal recording layer are shaped so as to have substantially the same radius of curvature.

According to the above described configuration, the distance between the kth signal recording layer and the surface having the guide grooves or pits or the guide grooves and pits of the (k−1)th signal recording layer becomes substantially uniform without changing the warpage of the kth signal substrate, and therefore the thickness of the manufactured (k−1)th separation layer becomes uniform.

A fifth aspect of the present invention is the method of manufacturing the multilayer optical information recording medium according to the first aspect of the present invention, wherein said (k−1)th separation layer is radiation cure resin.

According to the above described configuration, it is possible to easily cure the (k−1)th separation layer formed into a uniform thickness through irradiation with radiation rays and thereby improve the productivity.

A sixth aspect of the present invention is the method of manufacturing the multilayer optical information recording medium according to the fifth aspect of the present invention, wherein said radiation cure resin is UV cure resin.

According to the above described configuration, it is possible to use a UV cure type adhesive used for a conventional optical information recording medium such as CD and DVD and use their production facilities as well.

A seventh aspect of the present invention is the method of manufacturing the multilayer optical information recording medium according to the first aspect of the present invention, wherein said (k−1)th separation layer consists of a plurality of layers.

According to the above described configuration, it is possible to arrange materials of different characteristics in the thickness direction of the (k−1)th separation layer and stably peel them off, for example, using a material having good adhesiveness with the kth signal recording layer as the material contacting the kth signal recording layer of the (k−1)th separation layer and using a material which can be easily peeled away from the (k−1)th stamper as the material contacting the surface having the guide grooves or pits or the guide grooves and pits of the (k−1)th signal recording layer on the (k−1)th stamper of the (k−1)th separation layer.

An eighth aspect of the present invention is the method of manufacturing the multilayer optical information recording medium according to the seventh aspect of the present invention, wherein when a layer of said plurality of (k−1)th separation layers whose guide grooves and/or pits are transferred from said (k−1)th stamper is used as a transfer layer, of a plurality of interfaces including interfaces of the respective layers constituting said (k−1)th separation layer which exists between said (k−1)th stamper and said kth signal recording layer, the interface between said transfer layer and said (k−1)th stamper becomes the interface which is most easily peeled off.

According to the above described configuration, in the step of peeling off the (k−1)th stamper from the interface between the (k−1)th separation layer and the (k−1)th stamper, it is possible to perform stable peeling in the interface between the transfer layer and the (k−1)th stamper from among a plurality of interfaces and thereby improve yield in the peeling step.

A ninth aspect of the present invention is the method of manufacturing the multilayer optical information recording medium according to the seventh aspect of the present invention, wherein when the layer of the plurality of said (k−1)th separation layers whose guide grooves and/or pits are transferred from said (k−1)th stamper is regarded as a transfer layer, at least said transfer layer is a radiation cure material.

According to the above described configuration, the radiation cure material is easily cured with irradiation with radiation rays, and therefore it is possible to reliably copy shapes of grooves or pits from the (k−1)th stamper.

A tenth aspect of the present invention is the method of manufacturing the multilayer optical information recording medium according to the ninth aspect of the present invention, wherein said radiation cure material is UV cure resin.

According to the above described configuration, it is also possible to use production facilities used for conventional optical information recording medium such as CD and DVD.

An eleventh aspect of the present invention is the method of manufacturing the multilayer optical information recording medium according to the tenth aspect of the present invention, wherein the viscosity of said UV cure resin is 1 to 1000 mPa·s.

According to the above described configuration, UV cure resin can sufficiently fit into grooves or pits of the (k−1)th stamper, and therefore it is possible to improve transfers of grooves or pits.

A twelfth aspect of the present invention is the method of manufacturing the multilayer optical information recording medium according to the seventh aspect of the present invention, wherein when the layer of the plurality of said (k−1)th separation layers whose guide grooves and/or pits are transferred from said (k−1)th stamper is regarded as a transfer layer, at least one of said (k−1)th separation layers other than the transfer layer is a pressure-sensitive adhesive.

According to the above described configuration, if a pressure-sensitive adhesive is used as part of the (k−1)th separation layer, it is possible to form part of the (k−1)th separation layer without performing any, cure process such as radiation cure and thereby improve productivity.

A thirteenth aspect of the present invention is the method of manufacturing the multilayer optical information recording medium according to the seventh aspect of the present invention, wherein when the layer of the plurality of said (k−1)th separation layers whose guide grooves and/or pits are transferred from said (k−1)th stamper is regarded as a transfer layer, in said signal recording layer forming step, a radiation cure material which becomes said transfer layer is coated on the surface with guide grooves and/or pits of said (k−1)th stamper and cured, and pasted to said kth signal substrate on which said (k−1)th separation layers except said transfer layer are formed.

According to the above described configuration, it is possible to apply a radiation cure material which can be easily peeled off after cure to the (k−1)th stamper as the transfer layer and cure it beforehand and then transform it into a material which can easily adhere to the transfer layer which is obtained by curing the material of the side that contacts the transfer layer of the (k−1) th separation layer and thereby integrate the (k−1)th separation layer and reliably peel it off when the (k−1) th stamper is peeled off.

A fourteenth aspect of the present invention is the method of manufacturing the multilayer optical information recording medium according to the thirteenth aspect of the present invention, wherein when said (k−1)th stamper coated with said transfer layer is pasted to said kth signal substrate on which said (k−1)th separation layers except said transfer layer are formed, the surface of said (k−1)th separation layer which contacts said transfer layer coated on said (k−1)th stamper is a radiation cure material.

According to the above described configuration, by irradiating radiation rays, it is possible to easily adhere the transfer layer on the (k−1)th stamper to the (k−1)th separation layer on the kth signal substrate.

A fifteenth aspect of the present invention is the method of manufacturing the multilayer optical information recording medium according to the seventh aspect of the present invention, wherein when the layer of the plurality of said (k−1)th separation layers whose guide grooves and/or pits are transferred from said (k−1)th stamper is regarded as a transfer layer, in said signal recording layer forming step, a radiation cure material which becomes said transfer layer is placed between said (k−1)th stamper and said kth signal substrate on which said (k−1)th separation layers except said transfer layer are formed and then said radiation cure material is cured.

According to the above described configuration, if a radiation cure material is arranged between the (k−1) th stamper and the (k−1)th separation layer except the transfer layer formed on the kth signal substrate, the radiation-cured resin spreads uniformly through a capillary phenomenon and it is possible to further improve uniformity in the thickness of the separation layer. Furthermore, it is also possible to easily form a transfer layer through irradiation with radiation rays while keeping the uniformity.

A sixteenth aspect of the present invention is the method of manufacturing the multilayer optical information recording medium according to the fifteenth aspect of the present invention, wherein in said signal recording layer forming step, the radiation cure material which becomes said transfer layer is applied to at least one of the surface on which said (k−1)th separation layers except said transfer layer of said kth signal substrate and the surface with guide grooves and/or pits of said (k−1)th stamper and then said kth signal substrate is superimposed on said (k−1)th stamper and said radiation cure material is cured.

According to the above described configuration, a radiation cure material is applied to the entire surface of the (k−1) th stamper or the kth signal substrate before the two are put together, and therefore it is possible to adhere the surface of the (k−1)th stamper to the surface of the kth signal substrate and unite the separation layer over the entire surface.

A seventeenth aspect of the present invention is the method of manufacturing the multilayer optical information recording medium according to the thirteenth aspect of the present invention, wherein in said signal recording layer forming step, when said kth signal substrate and said (k−1)th stamper are arranged with said kth signal recording layer and the surface with guide grooves and/or pits of said (k−1)th signal recording layer facing each other, at least one of said kth signal substrate and said (k−1)th stamper is held in such a way that said (k−1)th stamper is shaped parallel to said kth signal substrate and then said radiation cure material is cured.

According to the above described configuration, even if the kth signal substrate is not shaped parallel to the (k−1)th stamper, the radiation cure material is cured by holding at least one of the two so that the shapes of the two are parallel to each other, and therefore it is not necessary to control the shapes of the kth signal substrate and the (k−1)th stamper and the margin of creation of the kth signal substrate and the (k−1)th stamper can be widened.

An eighteenth aspect of the present invention is the method of manufacturing the multilayer optical information recording medium according to the seventeenth aspect of the present invention, wherein in said signal recording layer forming step, at least one of said kth signal substrate and said (k−1)th stamper is fixed onto a support base having a desired surface shape and then said radiation cure material is cured.

According to the above described configuration, if the support member is used and the surface shape thereof is kept to a desired shape, it is possible to easily change the kth signal substrate or the (k−1)th stamper in a shape parallel to each other.

A nineteenth aspect of the present invention is the method of manufacturing the multilayer optical information recording medium according to the first aspect of the present invention, wherein said (k−1)th stamper is made of plastic.

According to the above described configuration, the weight of the (k−1)th stamper is reduced and therefore the (k−1)th stamper can be easily handled and can also improve productivity.

A twentieth aspect of the present invention is the method of manufacturing the multilayer optical information recording medium according to the nineteenth aspect of the present invention, wherein said plastic is transparent.

According to the above described configuration, when the separation layer is a radiation cure material, it is possible to cure the separation layer by irradiating radiation rays through the (k−1)th stamper.

A twenty-first aspect of the present invention is the method of manufacturing the multilayer optical information recording medium according to the twentieth aspect of the present invention, wherein said (k−1)th stamper is any one of polycarbonate, olefin resin, acrylic resin or norbornen-based resin and is created according to an injection molding method using a metal master stamper.

According to the above described configuration, stampers can be created at a low cost and in bulk, which improves the capacity of volume production of multilayer optical information recording media.

A twenty-second aspect of the present invention is the method of manufacturing the multilayer optical information recording medium according to the twenty-first aspect of the present invention, wherein in said signal recording layer forming step, when said kth signal substrate and said (k−1)th stamper are arranged with the kth signal recording layer and the surface with guide grooves and/or pits of said (k−1)th signal recording layer facing each other according to the conditions of the injection molding method in creating said (k−1)th stamper, said (k−1)th stamper is controlled so as to be shaped parallel to said kth signal substrate.

According to the above described configuration, the shape of the (k−1)th stamper can be accurately controlled through only injection molding conditions no matter what kind of warpage the kth signal substrate may have.

A twenty-third aspect of the present invention is the method of manufacturing the multilayer optical information recording medium according to the twenty-second aspect of the present invention, wherein in said signal recording layer forming step, when said (k−1)th stamper is created according to the injection molding method in order to shape said (k−1)th stamper warped so as to wrap around the surface opposite to the surface with guide grooves and/or pits of said (k−1)th signal recording layer, the temperature of the other metal die mirrored surface is set higher than the temperature of said metal master stamper placed on one of the pair of molding metal dies.

According to the above described configuration, the surface of the (k−1)th stamper made of plastics formed by an injection molding method is contracted more because immediately after it is removed from the molding die, the temperature of the surface opposite to the surface including the guide grooves or pits or the guide grooves and pits is higher, and it is therefore possible to warp the surface so as to wrap around the surface opposite to the surface including the guide grooves or pits or the guide grooves and pits.

A twenty-fourth aspect of the present invention is the method of manufacturing the multilayer optical information recording medium according to the twenty-third aspect of the present invention, wherein in said signal recording layer forming step, the temperature of the other metal die mirrored surface is set higher than the temperature of the metal die mirrored surface on which said metal master stamper of the pair of molding metal dies is placed.

According to the above described configuration, the surface of the (k−1)th stamper made of plastics formed by an injection molding method is contracted more because immediately after it is removed from the molding die, the temperature of the surface opposite to the surface including the guide grooves or pits or the guide grooves and pits is higher, and it is therefore possible to warp the surface so as to wrap around the surface opposite to the surface including the guide grooves or pits or the guide grooves and pits.

A twenty-fifth aspect of the present invention is the method of manufacturing the multilayer optical information recording medium according to the twenty-third aspect of the present invention, wherein a heat insulator is placed on the back of the metal die mirrored surface opposite to the metal die mirrored surface on which said metal master stamper of the pair of molding metal dies is placed.

According to the above described configuration, for the mirrored surface of the metal die opposite to the mirrored surface of the metal die for which the metal master stamper is installed, the heat insulator on the back makes it difficult for heat to dissipate, and can thereby effectively keep the temperature high.

A twenty-sixth aspect of the present invention is the method of manufacturing the multilayer optical information recording medium according to the twenty-second aspect of the present invention, wherein in said signal recording layer forming step, when said (k−1)th stamper is created according to the injection molding method in order to shape said (k−1)th stamper warped so as to wrap around the surface with guide grooves and/or pits of said (k−1)th signal recording layer, the temperature of said metal master stamper placed on the metal die mirrored surface of the pair of molding metal dies is set higher than the temperature of the other metal die mirrored surface.

According to the above described configuration, the surface of the (k−1)th stamper made of plastics formed by an injection molding method is more contracted because immediately after it is removed from the molding die, the temperature of the surface including the guide grooves or pits or the guide grooves and pits is higher than the temperature of the opposite surface, and it is therefore possible to warp the surface so as to wrap around the surface including the guide grooves or pits or the guide grooves and pits.

A twenty-seventh aspect of the present invention is the method of manufacturing the multilayer optical information recording medium according to the twenty-sixth aspect of the present invention, wherein in said signal recording layer forming step, the temperature of the metal die mirrored surface on which said metal master stamper of the pair of molding metal dies is placed is set higher than the temperature of the other metal die mirrored surface.

This makes it easier to make the temperature of the metal master stamper higher than the temperature of the mirrored surface of the other metal die.

A twenty-eighth aspect of the present invention is the method of manufacturing the multilayer optical information recording medium according to the twenty-sixth aspect of the present invention, wherein a heat insulator is placed on at least one of the back of said metal master stamper on which the pair of molding metal dies are placed and the back of the metal die mirrored surface on which said metal master stamper is placed.

This method can also inhibit the heat of high-temperature injected plastics from spreading over the mirrored surface of the metal die and thereby make the temperature of the metal master stamper relatively higher than the temperature of the mirrored surface of the other metal die.

A twenty-ninth aspect of the present invention is the method of manufacturing the multilayer optical information recording medium according to the first aspect of the present invention, wherein said (k−1)th stamper is metal.

According to the above described configuration, since metal has a relatively high degree of hardness, it is possible to suppress damage or deformation which may occur to the (k−1)th stamper when the (k−1)th stamper is peeled off the kth signal substrate and thereby improve the productivity of the multilayer optical information recording medium.

A thirtieth aspect of the present invention is the method of manufacturing the multilayer optical information recording medium according to the twenty-ninth aspect of the present invention, wherein in said signal recording layer forming step, when said (k−1)th stamper is created by electrocasting and said kth signal substrate and said (k−1)th stamper are arranged with said kth signal recording layer and the surface with guide grooves and/or pits of said (k−1)th signal recording layer facing each other under at least one electrocasting conditions of the pH value, temperature and current density of the electrocasting bath during electrocasting, said (k−1)th stamper is controlled so as to be shaped parallel to said kth signal substrate.

According to the above described configuration, it is possible to create the (k−1)th stamper easily and at lower cost. Furthermore, electrocasting is a conventional method with an established technology, and can thereby control the shape of the stamper-stably according to the electrocasting conditions.

A thirty-first aspect of the present invention is the method of manufacturing the multilayer optical information recording medium according to the first aspect of the present invention, further comprising a film forming step after said peeling step, of completing the (k−1)th signal recording layer by forming a recording multilayer film (hereinafter referred to as (k−1)th recording multilayer film) or a reflecting film on the guide grooves and/or pits of said transferred (k−1)th signal recording layer.

A thirty-second aspect of the present invention is the method of manufacturing the multilayer optical information recording medium according to the first aspect of the present invention, wherein a (k−1)th recording multilayer film or a reflecting film is formed on the guide grooves and/or pits of the (k−1)th signal recording layer on said (k−1)th stamper and in said peeling step, said (k−1)th stamper is peeled off the interface between said (k−1)th recording multilayer film and said (k−1)th stamper and said (k−1)th recording multilayer film or reflecting film is moved onto said (k−1)th separation layer.

A thirty-third aspect of the present invention is the method of manufacturing the multilayer optical information recording medium according to the first aspect of the present invention, wherein a transparent cover layer is formed on the first signal recording layer.

A thirty-fourth aspect of the present invention is the method of manufacturing the multilayer optical information recording medium according to the thirty-third aspect of the present invention, wherein a transparent substrate is adhered to the first signal recording layer with a transparent adhesive as said transparent cover layer.

According to the above described configuration, it is possible to easily form a uniform transparent cover layer.

A thirty-fifth aspect of the present invention is the method of manufacturing the multilayer optical information recording medium according to the thirty-third aspect of the present invention, wherein said transparent cover layer is formed of a transparent radiation cure material.

According to the above described configuration, it is possible to reduce the cost.

A thirty-sixth aspect of the present invention is the method of manufacturing the multilayer optical information recording medium according to the thirty-third aspect of the present invention, wherein at least part of said transparent cover layer is formed of a pressure-sensitive adhesive.

According to the above described configuration, it is possible to easily form a uniform transparent cover layer.

A thirty-seventh aspect of the present invention is the method of manufacturing the multilayer optical information recording medium according to the thirty-third aspect of the present invention, wherein the thickness of the transparent cover layer formed on the first signal recording layer is about 0.3 mm or less.

According to the above described configuration, when recording or reproduction is performed using a lens with numerical aperture of about 0.6 or greater, it is possible to suppress aberration of focused light caused by warpage of the multilayer optical information recording medium and thereby record or reproduce high density information.

Furthermore, the 38th aspect of the present invention is an apparatus of manufacturing a multilayer optical information recording medium comprising n (n is an integer not smaller than 2) signal recording layers and a separation layer between the respective signal recording layers, wherein when it is assumed that the kth (k is an integer not smaller than 2 and not greater than n) signal recording layer from the recording surface or reproducing surface is the kth signal recording layer, the substrate having the kth signal recording layer on its surface is the kth signal substrate, the stamper having guide grooves and/or pits of the (k−1)th signal recording layer is the (k−1)th stamper and the separation layer between the kth signal recording layer and the (k−1)th signal recording layer is the (k−1)th separation layer, the apparatus of manufacturing the multilayer optical information recording medium comprises:

measuring means of measuring surface shapes of one or a plurality of the kth signal substrates manufactured currently or in the past;

shape maintaining means of maintaining the surface having the guide grooves and/or pits of the (k−1)th signal recording layer of the (k−1)th stamper in a shape corresponding to the surface shape of the kth signal substrate;

signal recording layer forming means of forming the (k−1)th signal recording layer using the (k−1)th stamper; and peeling means of peeling off the (k−1)th stamper from the interface between the (k−1)th separation layer and the (k−1)th stamper.

According to the method of manufacturing the multilayer optical information recording medium of the above described aspect, it is easy to maintain the (k−1)th stamper and the kth signal substrate in a shape parallel to each other, it is also possible to form a separation layer between the two and peel off the (k−1)th stamper and the kth signal substrate. In this way, it is possible to manufacture a multilayer optical information recording medium with the separation layer having a uniform thickness.

The 39th aspect of the present invention is the apparatus of manufacturing the multilayer optical information recording medium according to the 38th aspect, wherein the shape maintaining means comprises a mechanism which holds the (k−1)th stamper so that when the kth signal substrate is warped, the guide grooves and/or pits of the (k−1)th signal recording layer and the kth signal recording layer are parallel to each other according to the warpage of the kth signal substrate.

According to the above described configuration, since the guide grooves or pits or the guide grooves and pits of the (k−1)th signal recording layer are parallel to the kth signal recording layer according to the warpage of the kth signal substrate, it is possible to keep uniform the thickness of the (k−1)th separation layer formed between the two.

The 40th aspect of the present invention is the apparatus of manufacturing the multilayer optical information recording medium according to the 39th aspect, wherein the shape maintaining means is table-shaped and has the surface shape that contacts the (k−1)th stamper so that the guide grooves and/or pits of the (k−1)th signal recording layer are parallel to the kth signal recording layer.

According to the above described configuration, it is possible to easily change the shape of the (k−1)th stamper with the table-shaped shape maintaining means.

The 41st aspect of the present invention is the apparatus of manufacturing the multilayer optical information recording medium according to the 38th aspect, wherein the shape maintaining means supports the surface of at least one of the (k−1)th stamper and the kth signal substrate for which the (k−1)th separation layer is not formed by "vacuum suction".

According to the above described configuration, it is possible to reliably maintain the shape of the (k−1)th stamper or the kth signal substrate.

BRIEF DESCRIPTION OF THE DRAWINGS

FIG. 3(a) illustrates a step of forming transfer layer UV cure resin on the (k−1)th stamper of the one example of the method of forming the (k−1)th separation layer according to Embodiment 1 of the present invention;

FIG. 3(b) illustrates a step of curing the transfer layer UV cure resin by irradiating UV rays of the one example of the method of forming the (k−1)th separation layer according to Embodiment 1 of the present invention;

FIG. 3(c) illustrates a step of pasting the (k−1)th stamper on which the transfer layer is formed and the kth signal substrate of the one example of the method of forming the (k−1)th separation layer according to Embodiment 1 of the present invention;

FIG. 3(d) illustrates a step of curing UV cure resin for an adhesive by irradiating UV rays of the one example of the method of forming the (k−1)th separation layer according to Embodiment 1 of the present invention;

FIG. 4(a) illustrates an example of a thickness distribution of a separation layer formed according to the method of manufacturing the multilayer optical information recording medium according to Embodiment 1 of the present invention;

FIG. 4(b) illustrates an example of a thickness distribution of a separation layer formed according to a conventional method;

FIG. 5(a) illustrates a step of forming a transfer layer of the one example of the method of manufacturing a conventional multilayer optical information recording medium;

FIG. 5(b) illustrates a step of curing the transfer layer of the one example of the method of manufacturing the conventional multilayer optical information recording medium;

FIG. 5(c) illustrates a step of forming an adhesive layer of the one example of the method of manufacturing the conventional multilayer optical information recording medium;

FIG. 5(d) illustrates a step of completing the (k−1)th separation layer of the one example of the method of manufacturing the conventional multilayer optical information recording medium;

FIG. 6(a) illustrates a step of vacuum suctioning of the one example of the method of peeling the (k−1)th stamper according to Embodiment 1 of the present invention;

FIG. 6(b) illustrates a step of inserting a lug into the interface between the transfer layer and the (k−1)th stamper of the one example of the method of peeling the (k−1)th stamper according to Embodiment 1 of the present invention;

FIG. 6(c) illustrates a step of pulling up the (k−1)th stamper using handling means of the one example of the method of peeling the (k−1)th stamper according to Embodiment 1 of the present invention;

FIG. 6(d) illustrates a step of peeling off the (k−1)th stamper of the one example of the method of peeling the (k−1)th stamper according to Embodiment 1 of the present invention;

FIG. 14(a) illustrates a step of measuring the shape of the kth signal substrate according to Embodiment 5 of the present invention;

FIG. 14(b) illustrates a case where the (k−1)th stamper is held by the shape maintaining means according to Embodiment 5 of the present invention;

FIG. 14 (c) illustrates a case where UV cure resin for an adhesive layer which becomes part of the (k−1)th separation layer is applied in a space with the kth signal substrate while the shape of the (k−1)th stamper is maintained according to Embodiment 5 of the present invention;

FIG. 14(d) illustrates a case where the shape maintaining means holds the (k−1)th stamper when the kth signal substrate according to Embodiment 5 of the present invention is warped in such a way as to wrap around the surface opposite to the surface with the kth signal recording layer;

FIG. 15(a) illustrates a step of measuring the shape of the kth signal substrate, which is a second example of the shape maintaining means and the separation layer forming means according to Embodiment 5 of the present invention;

FIG. 15(b) illustrates a step of maintaining the shape of the (k−1)th stamper, which is the second example of the shape maintaining means and the separation layer forming means according to Embodiment 5 of the present invention;

FIG. 15(c) illustrates a step of applying adhesive layer UV cure resin which becomes part of the separation layer, which is the second example of the shape maintaining means and the separation layer forming means according to Embodiment 5 of the present invention; and FIG. 15(d) illustrates a step of holding the (k−1)th stamper using a concave shape maintaining table, which is the second example of the shape maintaining means and the separation layer forming means according to Embodiment 5 of the present invention.

Figure 1A:
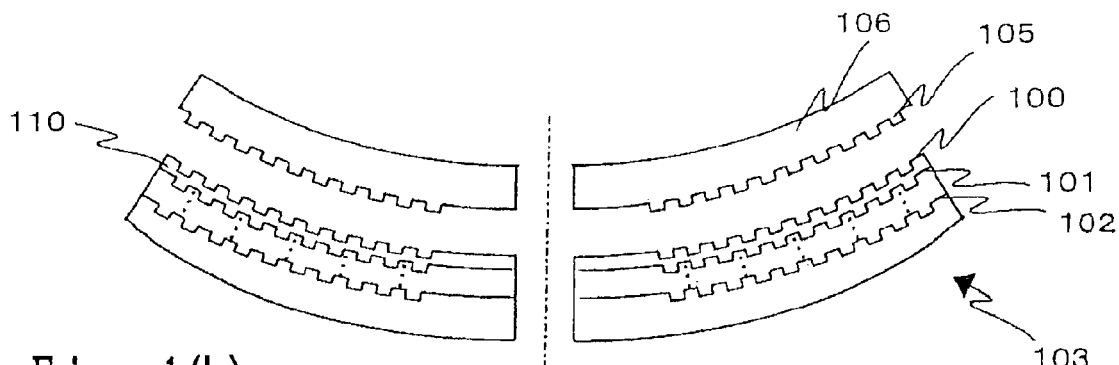
FIG. 1(a) is a schematic view showing a step of preparing the kth signal substrate and the (k−1)th stamper of the method of manufacturing a multilayer optical information recording medium according to Embodiment 1 of the present invention.

DESCRIPTION OF SYMBOLS 103, 306, 803, 900 kth signal substrate
100, 800 kth signal recording layer
101, 801 (k+1)th signal recording layer
102, 802 nth signal recording layer
110 kth separation layer
105, 805 guide grooves and pits of (k−1)th signal recording layer
106, 204, 300, 500, 806, 902 (k−1)th stamper
107, 310, 510, 807, 909 (k−1)th separation layer
108, 808 guide grooves and pits of transferred (k−1)th signal recording layer
200 molding metal die
201 master stamper
202 polycarbonate
203 cavity
205 surface on which guide grooves and pits are formed
206 surface on opposite side
305, 309, 509, 720, 904 table
301, 903 transfer layer UV cure resin
302, 910 UV lamp
303, 503 transfer layer
307 adhesive layer UV cure resin
308, 508, 730 adhesive layer
600 peeling table
610 lug
615 air
612 handling means
700 film
710 first signal substrate
740, 901 pressure-sensitive adhesive
745, 905 chamber
750 cover material
1100 target
1101 (k−1)th recording multilayer film
1200 heat insulator
1400 shape maintaining arm
1401 warpage measuring means
1402 measuring light
1403 nozzle
1500 shape maintaining table
1501 concave shape maintaining table
D1 diameter of central hole of pressure-sensitive adhesive
D0 diameter of central hole of kth signal substrate and central hole of (k−1)th stamper
D2 inside diameter of transfer layer UV cure resin

BEST MODE FOR CARRYING OUT THE INVENTION

With reference now to the attached drawings, embodiments of the present invention will be explained in detail below.

Embodiment 1

Figure 1B:
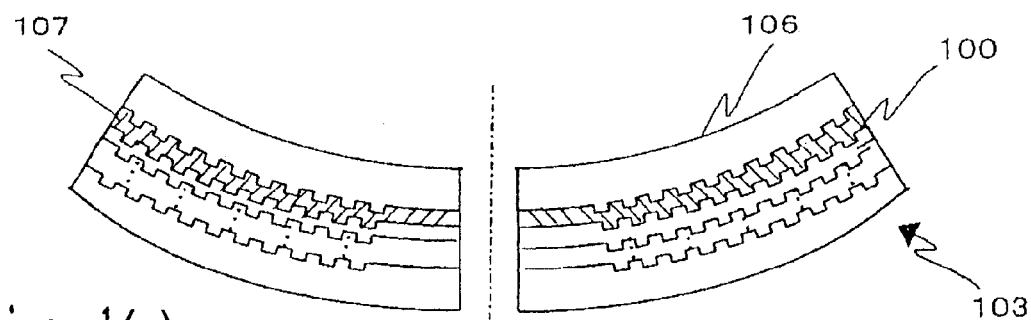
FIG. 1(b) illustrates a step of forming a separation layer between the (k−1)th signal recording layer and the kth signal recording layer of the method of manufacturing the multilayer optical information recording medium according to Embodiment 1 of the present invention.
Figure 1C:
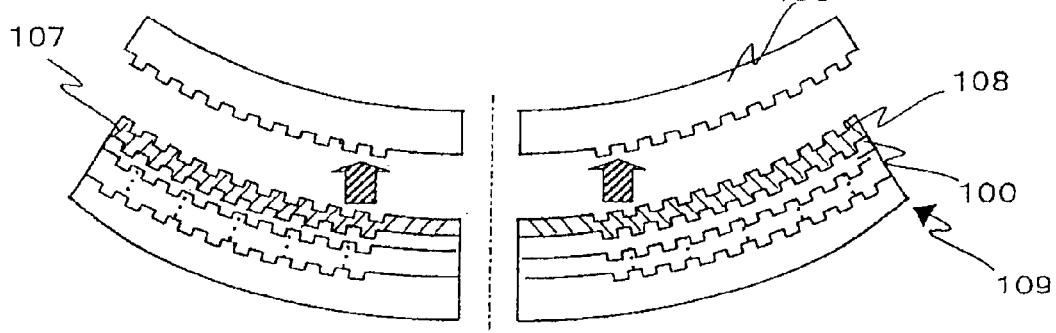
FIG. 1(c) illustrates a step of performing peeling from an interface between the transferred (k−1)th signal recording layer on the (k−1)th separation layer and the (k−1)th stamper of the method of manufacturing the multilayer optical information recording medium according to Embodiment 1 of the present invention.

FIGS. 1(a)-1(c) show an embodiment of a method of manufacturing a multilayer optical information recording medium according to the present invention. FIGS. 1(a)-1(c) are schematic views of a step of forming a (k−1)th separation layer 107 between a kth signal recording layer 100 and a (k−1)th signal recording layer of a disk type multilayer optical information recording medium having n (n: 2 or more) signal recording layers and a separation layer between the respective signal recording layers recording and reproducing information to/from one side. Here, suppose the kth signal recording layer 100 is the kth (k: 2 or above and n or below) signal recording layer from the recording/reproduction surface and a substrate having the kth signal recording layer 100 on the surface is a kth signal substrate 103. Furthermore, suppose the stamper having guide grooves and pits 105 of the (k−1)th signal recording layer is a (k−1)th stamper 106.

The step of forming a (k−1)th separation layer 107 of this embodiment is an example of the step of forming a signal recording layer of the present invention.

The method of manufacturing the multilayer optical information recording medium of Embodiment 1 is intended to manufacture a high density optical information recording medium having a low-profile recording/reproducing side transparent cover layer of about 0.3 mm or less and about 2 microns or above in thickness using a violet laser light source (wavelength of approximately 400 nm) and a high NA lens to improve the surface recording density per one layer. The methods of manufacturing multilayer optical information recording media of embodiments other than Embodiment 1 are also intended to manufacture a high density optical information recording medium similar to that of Embodiment 1. It goes without saying that it is possible to apply the method of manufacturing the multilayer optical information recording medium of this embodiment to any media other than such a high density optical information recording medium.

Both the kth signal substrate 103 and the (k−1)th stamper 106 in FIGS. 1(a)-1(c) are disk-shaped and have a central hole in the center. The kth signal substrate 103 is designed to have a warped shape making allowances for warpage that can occur in other steps following the step of forming the (k−1)th separation layer 107 such as the step of forming a signal recording layer or a step of forming a transparent cover layer on the first signal recording layer. Furthermore, the kth signal substrate 103 is generally naturally warped due to stress caused in the step of forming the kth recording multilayer film of the kth signal recording layer 100, the step of forming the (k−1)th to nth separation layers and the step of forming the (k−1)th to nth recording multilayer films, etc. This Embodiment 1 shows the kth signal substrate 103 warped so as to wrap around the kth signal recording layer 100 as an example.

First, the kth signal substrate 103 is prepared as shown in FIG. 1(a). In addition to the kth signal recording layer 100 on its surface, the kth signal substrate 103 has a total of (n-k-1) signal recording layers from the (k−1)th signal recording layer 101 up to the nth signal recording layer 102. Here, the signal recording layer consists of guide grooves for guiding recording light and reproducing light to record data in and reproduce data from the multilayer optical information recording medium, pits indicating address information, phase variation films such as GeSbTe and AgInSbTe, recording films represented by magnetic films and pigment films and recording multilayer film made of a dielectric film such as ZnS sandwiching them or reflecting film. Furthermore, a separation layer represented by the kth separation layer 110 is arranged between the respective signal recording layers. The multilayer optical information recording medium of this embodiment is not limited to the one made up of only guide grooves in which video/audio data is written after manufacturing but can also be the one made up of pits in which video/audio data is written during manufacturing or the one with pits formed inside or outside the guide grooves.

On the other hand, the (k−1)th stamper 106 having guide grooves and pits 105 of the (k−1)th signal recording layer on its surface is also prepared. The (k−1)th stamper 106 has been created by measuring the surface shape of one or a plurality of the kth signal substrates 103 which have been created currently or in the past as in the case of warpage measuring means 1401 which will be shown in FIG. 14 of Embodiment 5 which will be described later and based on the measurement result, transforming the surface having guide grooves and pits 105 of the (k−1) th signal recording layer of the (k−1)th stamper 106 into the shape corresponding to the surface shape of the kth signal substrate 103. That is, the (k−1)th stamper 106 has been formed so as to conform to the shape of the kth signal substrate 103.

Then, the surface shape of the kth signal substrate 103 may be measured by measuring the surface shape of the kth-signal substrate 103 manufactured first in the morning the day before when the plant operates and determining the shape of the (k−1)th stamper 106 based on the measurement result. Furthermore, it is also possible to measure the shape of the kth signal substrates 103 one by one every time the kth signal substrate 103 is manufactured and determine the shape of the (k−1)th stamper 106 based on the measurement result. Furthermore, it is also possible to determine the shape of the (k−1)th stamper 106 using the measurement result of the shape surface of the kth signal substrate 103 for each lot.

That is, by measuring the shape of the kth signal substrate 103 and determining the shape of the (k−1)th stamper 106 from the measurement result, the (k−1)th stamper 106 and the kth signal substrate 103 come to have shapes parallel to each other as shown in the figure. That is, the guide grooves and pits 105 of the (k−1)th signal recording layer and the kth signal recording layer 100 are arranged parallel to each other and the distance between the two becomes uniform in the radial direction and within the surface. That is, the kth signal recording layer 100 of the kth signal substrate 103 and the surface having guide grooves and/or pits 105 of the (k−1)th signal recording layer are shaped so as to have substantially the same curvature radius. In general, a substrate having a plurality of signal recording layers as in the case of the kth signal substrate 103 is warped due to stress of the films such as recording multilayer films and reflecting films. Thus, the (k−1)th stamper 106 of this embodiment is shaped so as to be parallel to the already warped kth signal substrate 103 and guide grooves and pits 105 of the (k−1)th signal recording layer and the kth signal recording layer 100 are arranged so as to face each other.

Then, as shown in FIG. 1(b), the (k−1)th separation layer 107 is formed between the guide grooves and pits 105 of the (k−1)th signal recording layer and the kth signal recording layer 100. At this time, it is necessary to ensure that the (k−1)th stamper side of the (k−1)th separation layer 107 fit into the guide grooves and pits 105 of the (k−1)th signal recording layer. In FIG. 1(1), the distance between the guide grooves and pits 105 of the (k−1)th signal recording layer and the kth signal recording layer 100 is uniform in the radial direction and within the surface, and therefore the thickness of the (k−1)th separation layer 107 becomes uniform. The (k−1)th separation layer 107 need not always be made of one material but may also be made up of a plurality of layers made of different materials. For example, when the layer contacting the guide grooves and pits 105 of the (k−1)th signal recording layer of the (k−1)th separation layer 107 is used as a transfer layer, if a liquid material having a curing characteristic is used as a transfer layer, it is easily fitted into the guide grooves and pits 105 of the (k−1)th signal recording layer and it is possible to improve transferability. In this case, the transfer layer is cured and the (k−1)th separation layer 107 is completed.

Then, as shown in FIG. 1(c), peeling is performed from the interface between the guide grooves and pits 108 of the transferred (k−1)th signal recording layer on the (k−1)th separation layer 107 and the (k−1)th stamper 106. Such peeling can provide the (k−1)th signal substrate. To ensure the peeling, it is important that the interface between the (k−1)th separation layer 107 and the (k−1)th stamper 106 be the one that can be peeled most easily from among a plurality of interfaces that exist between the (k−1)th stamper 106 and the kth signal recording layer 100. To this effect, it is possible to select the material of the transfer layer, material of the (k−1)th stamper 106 and material of its surface, etc.

As shown above, it is possible to form a uniform separation layer by shaping the guide grooves and pits 105 of the (k−1)th signal recording layer of the (k−1)th stamper 106 and the kth signal recording layer 100 on the kth signal substrate 103 parallel to each other and forming the (k−1)th separation layer 107. Manufacturing all of the plurality of separation layers in the above described steps makes it possible to improve the accuracy of the overall multilayer optical information recording medium and drastically improve the information recording or reproducing performance of each signal recording layer.

Figure 2:
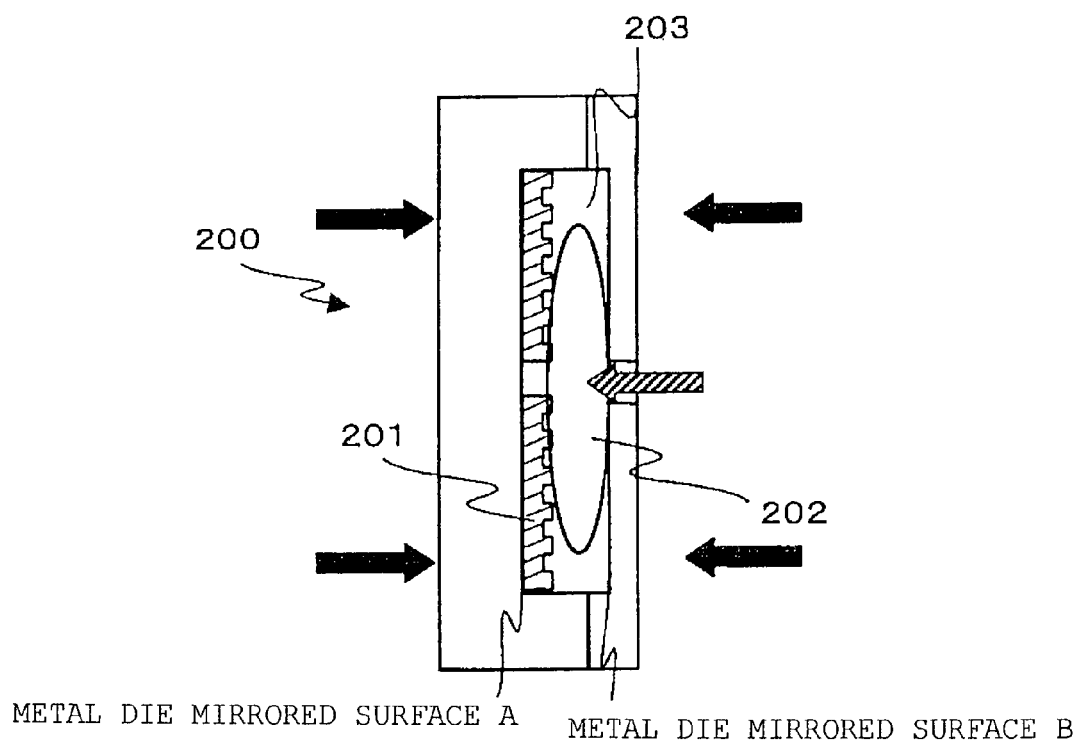
FIG. 2(a) illustrates a step of injecting/charging melted polycarbonate into a molding metal die of the method of creating the (k−1)th stamper in Embodiment 1 of the present invention.
FIG. 2(b) illustrates a step of removing the (k−1)th stamper from the molding metal die of the method of creating the (k−1)th stamper in Embodiment 1 of the present invention.
Figure 2B:
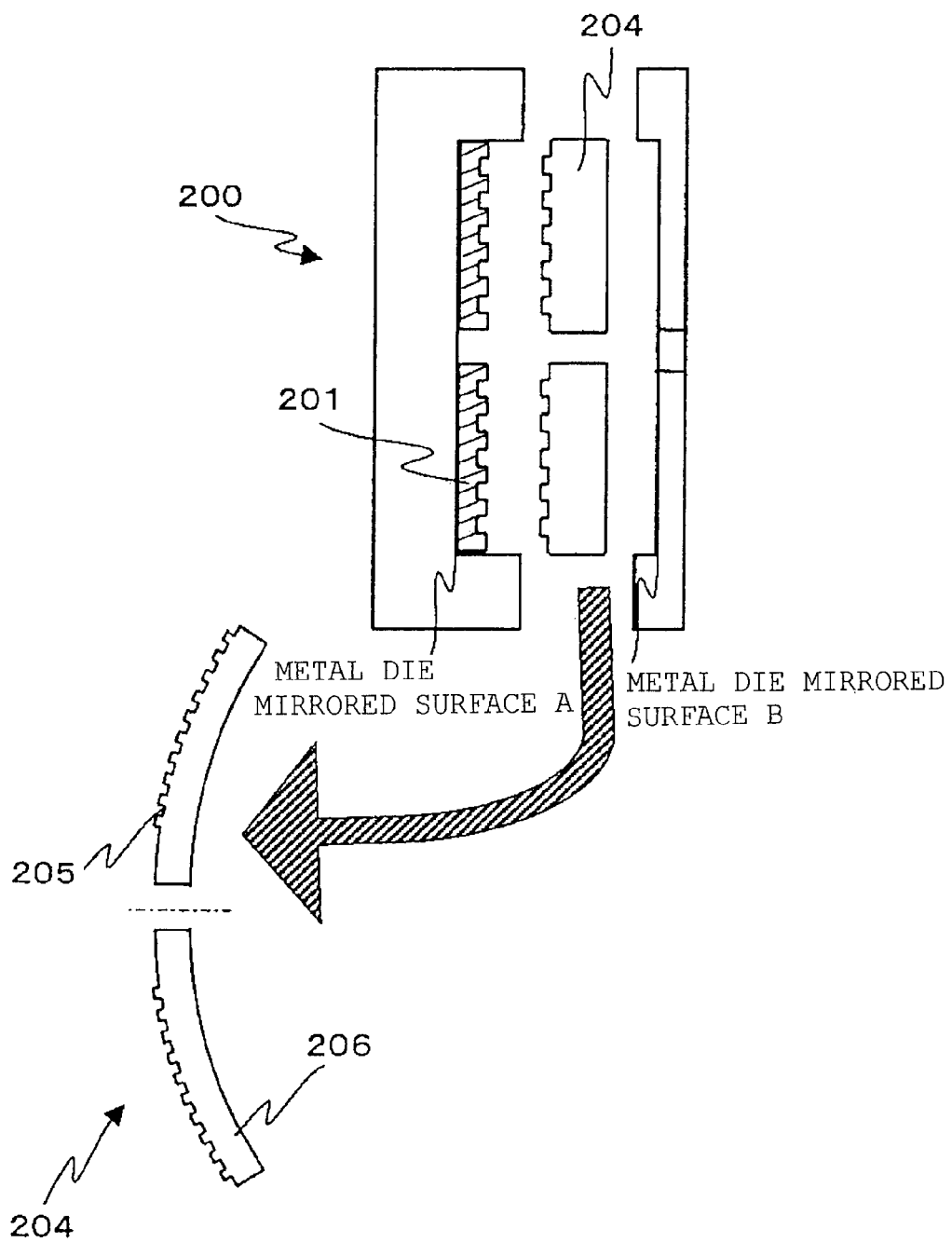

Examples of the respective steps in above described FIGS. 1(a)-1(c) will be explained in detail below. FIGS. 2(a)-2(b) show steps of forming the (k−1)th stamper. Here, plastic is used as the material of the (k−1)th stamper. Plastic is light, has an excellent operability and is convenient because it can be easily created in bulk using an injection molding method. It also has an advantage that a desired shape (warpage) can be provided by controlling molding conditions. Here, polycarbonate is used as the material of the (k−1)th stamper. In addition to polycarbonate, olefin resin, acrylic resin and norbornen-based resin, etc., can also be used.

First, as shown in FIG. 2(a), a master stamper 201 is placed on a metal die mirrored surface A of a pair of molding metal dies 200 and polycarbonate 202 melted at about 380° C. is molded and charged into the molding metal die 200. The master stamper 201 is made of, for example, a material whose principal ingredient is metal such as nickel. A cavity 203 formed between the master stamper 201 of the molding metal die 200 and the metal die mirrored surface B is predetermined to have a desired thickness of the (k−1)th stamper. Here, the thickness of the cavity 293 for forming the (k−1)th stamper of approximately 1.1 mm in thickness is 1.1 mm. The metal die mirrored surface A and the metal die mirrored surface B of the molding metal die 200 are set to their respective temperatures.

Here, the temperatures of the metal die mirrored surfaces A and B are set to about 115° C. and about 125° C. respectively so that (temperatures of metal die mirrored surface A)<(temperatures of metal die mirrored surface B). These temperatures allow the polycarbonate 202 melted at 380° C. to be cooled and calcified. When polycarbonate is injected/charged, a mold pressing force of about 20 to 30 t is applied to the molding metal die 200. The mold pressing force causes the melted polycarbonate to fit into the guide grooves and pits formed in the master stamper 201 and to transfer them.

After cooling (e.g., for 10 seconds), as shown in FIG. 2(b), the (k−1)th stamper 204 is removed from the molding metal die 200. At this time, since (temperature of metal die mirrored surface A)<(temperature of metal die mirrored surface B), the temperature of the surface 205 on which guide grooves and pits of the (k−1)th stamper 204 are formed is lower than the temperature of the surface 206 on the opposite side. Therefore, the amount of contraction when the temperature is lowered to a room temperature is greater on the surface 206 on the opposite side and as a result, the (k−1)th stamper 204 acquires a shape wrapping around the surface 206 on the opposite side. The (k−1)th stamper 106 shown in FIG. 1(1) is created in this way.

FIGS. 3(a)-3(d) show steps of forming the (k−1)th separation layer. According to Embodiment 1, the (k−1)th separation layer is made of two materials and a case where both the outside diameter of the kth signal substrate and the outside diameter of the (k−1)th stamper are 120 mm will be explained using an example. First, as shown in FIG. 3(a), a (k−1)th stamper 300 is placed on a table 305 with the surface provided with guide grooves and pits of the (k−1)th stamper facing upward. The (k−1)th stamper 300 can be created using the method shown in FIGS. 2(a)-2(b). The (k−1)th stamper 300 set is fixed onto the table 305 using a method such as vacuum suction. At this time, the surface shape of the table 305 is preferably shaped with the same curvature as that of the (k−1)th stamper as shown in the figure. This is because the shape of the (k−1)th stamper 300 itself is controlled in the steps shown in FIGS. 2(a)-2(b).

With transfer layer UV cure resin 301 dribbled onto the surface with the guide grooves and pits of the (k−1)th stamper, the table 305 is turned to throw off extra transfer layer UV cure resin and a layer of the transfer layer UV cure resin of a uniform thickness is obtained. As the UV cure resin, acrylic resin which radically reacts with irradiation of UV rays is preferable. In this embodiment, acrylic UV cure resin with a viscosity of 200 MPa·s which can be easily peeled from the polycarbonate (k−1)th stamper 300 is used. UV cure resin with a viscosity of about 1 to 1000 MPa·s can well fit into the projections and depressions of guide grooves and pits on the stamper. Through spinning at a speed of 4000 rpm for 5 seconds, a transfer layer of approximately 8 microns in thickness was obtained.

Then, as shown in FIG. 3(b), UV rays are irradiated using a UV lamp 302. As the UV lamp 302, a metal halide lamp, high pressure mercury lamp or xenon lamp, etc., is preferably used. Irradiation with UV rays cures the transfer layer UV cure resin 301 and forms a transfer layer 303.

Then, as shown in FIG. 3(c), the (k−1)th stamper 300 on which the transfer layer 303 is formed is pasted to the kth signal substrate 306. In the kth signal substrate 306, not only the guide grooves and pits of the kth signal recording layer and kth recording multilayer film are formed, but also the (k+1)th to nth signal recording layers (not shown) are included. With the kth signal substrate 306 fixed on a table 309 by means of vacuum suction, an adhesive layer UV cure resin 307 which becomes an adhesive is dribbled onto the kth signal recording layer and the transfer layer 303 of the (k−1)th stamper 300 is placed so as to contact the adhesive layer UV cure resin 307. Then, the table 309 is turned as shown in the figure to throw off extra adhesive layer UV cure resin. In this embodiment, the table was turned at 5000 rpm for 8 seconds. As the adhesive layer UV cure resin 307, acrylic UV cure resin of 600 mpa·s with high strength of adhesion to the kth recording multilayer film and transfer layer 303 was used.

Then, as shown in FIG. 3(d), UV rays are irradiated from the UV lamp 302 to cure the adhesive layer UV cure resin 307. As the UV lamp 302, a metal halide lamp, high pressure mercury lamp or xenon lamp, etc., can be used as in the case of above described FIG. 3(b). The (k−1)th stamper 300 has transparency such as polycarbonate, and therefore can allow UV rays to penetrate to some extent to cure the adhesive layer UV cure resin 307. After the cure, the average thickness of the adhesive layer 308 is 22 microns and the transfer layer 303 and adhesive layer 308 which have been united by the cure becomes a (k−1)th separation layer 310.

Figure 4:
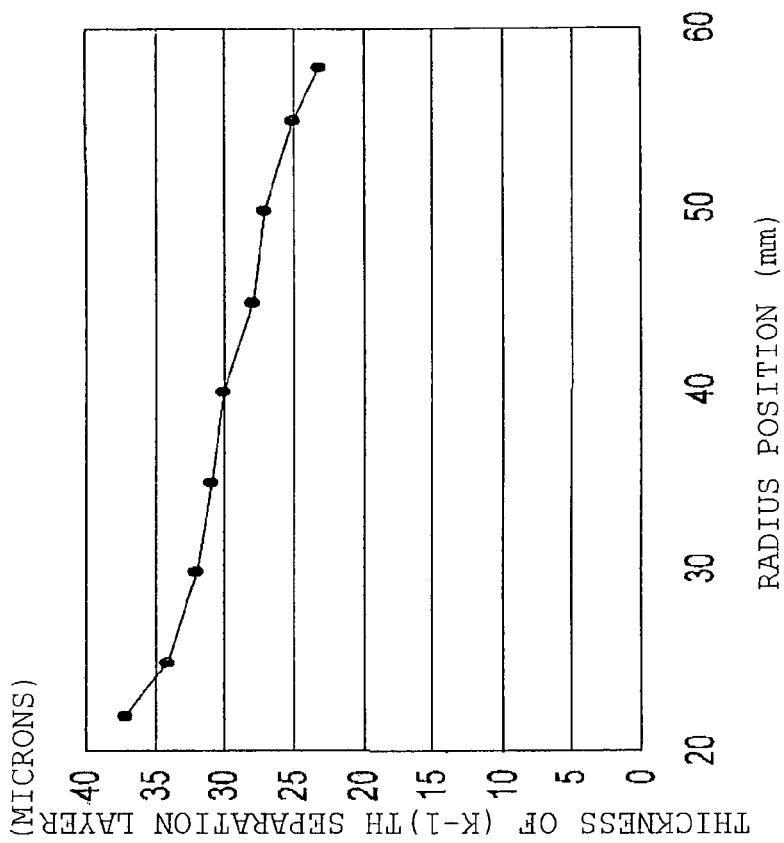
FIGS. 4(a)-4(b) illustrate examples of a thickness distribution of a separation layer formed according to the method of manufacturing the multilayer optical information recording medium of the present invention.
Figure 4:
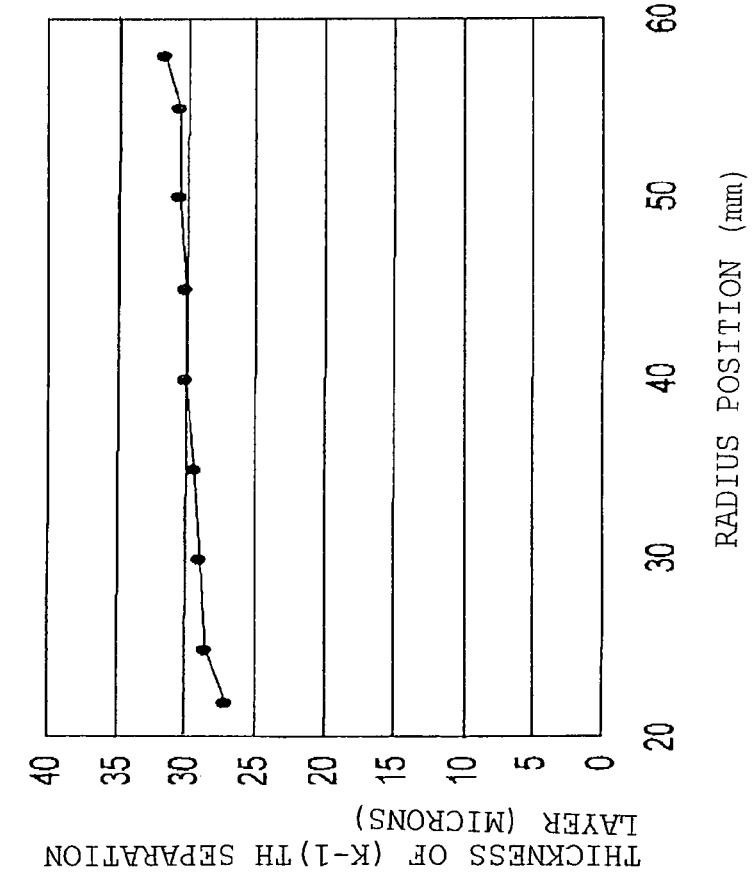

The thickness of the (k−1)th separation layer 310 was as shown in FIG. 4(a). In FIG. 4(a), the thickness of the (k−1)th separation layer in the radial direction was 27 to 31 microns, which is a variation of 4 microns, which can be considered uniform. On the other hand, FIG. 4(b) shows a thickness variation of the (k−1)th stamper in the radial direction of the (k−1)th separation layer created using a conventional method. The thickness tends to increase toward the inside radius and has a large variation of 14 microns in the range of 23 to 37 microns. In this embodiment, as shown in FIG. 4(a), the thickness variation of the (k−1)th separation layer in the radial direction is about 4 microns, which can be considered uniform, but it is possible to maintain the performance of a high density optical information recording medium if the variation is within about 6 microns.

FIGS 5(a)-5(d) show how the (k−1)th separation layer is created when the (k−1)th stamper is created into a flat shape using the injection molding method as in the conventional method. It is substantially the same as the steps shown in FIG. 3 except that the shape of the (k−1)th stamper 500 is flat. FIGS. 5(a) and 5(b) show the step of forming a transfer layer 503, while FIGS. 5(c) and 5(d) show the step of forming an adhesive layer 508 and completing a (k−1)th separation layer 510. Since the shape of the (k−1)th stamper 500 is flat, it is natural that a table 505 be flat. Furthermore, since the (k−1)th stamper 500 is flat as shown in FIG. 5(c), the distance between the surface with guide grooves and pits of the (k−1)th stamper 500 and the kth signal recording layer of the kth signal substrate 306 increases toward the inside radius. For this reason, the thickness of an adhesive layer 508 increases toward the inside radius as shown in FIG. 5(d) and as a result, the thickness of the (k−1)th separation layer 510 consisting of the adhesive layer 508 and transfer layer 503 also increases toward the inside radius.

FIGS. 3(a)-3(d) describe the steps of forming the (k−1)th separation layer, but steps shown in (A) to (C) below are also effective instead.

(A) In the step in FIG. 3(a), transfer layer UV cure resin is applied to the (k−1)th stamper but it is not cured with UV rays. On the other hand, using the same method as that in FIG. 3(a), adhesive layer UV cure resin is applied to the kth signal substrate. After the (k−1)th stamper is superimposed on the kth signal substrate in a chamber under a reduced pressure, the transfer layer UV cure resin and adhesive layer UV cure resin are cured with UV rays as shown in FIG. 3(d).

(B) In the step in FIG. 3(a), transfer layer UV cure resin is applied to the (k−1)th stamper and this is cured with UV rays as shown in FIG. 3(b). On the other hand, using the same method as that in FIG. 3(a), adhesive layer UV cure resin is applied to the kth signal substrate. After the (k−1)th stamper is superimposed on the kth signal substrate in a chamber under a reduced pressure, the adhesive layer UV cure resin is cured with UV rays as shown in FIG. 3(d).

(C) In the step in FIG. 3(a), transfer layer UV cure resin is applied to the (k−1)th stamper and this is not cured with UV rays. On the other hand, using the same method as that in FIG. 3(a), adhesive layer UV cure resin is applied to the kth signal substrate and cured with UV rays. After the (k−1)th stamper is superimposed on the kth signal substrate in a chamber under a reduced pressure, the transfer layer UV cure resin is cured with UV rays as shown in FIG. 3(d).

Furthermore, FIG. 3(c) has described the case where with the kth signal substrate 306 fixed on the table 309 by means of vacuum suction, the adhesive layer UV cure resin 307 which becomes an adhesive is dribbled onto the kth signal recording layer and the transfer layer 303 of the (k−1)th stamper 300 is placed from above so as to contact the adhesive layer UV cure resin 307, then the table 309 is turned to throw off extra adhesive layer UV cure resin, but the method is not limited to this.

It is also possible to form a layer of transfer layer UV cure resin 301 on the (k−1)th stamper 300, apply the adhesive layer UV cure resin 307 onto the (k−1)th stamper 300 on which the layer of the transfer layer UV cure resin 301 is formed and then paste the (k−1)th stamper 300 to the kth signal substrate 306. It is further possible to apply the adhesive layer UV cure resin 307 onto the kth signal substrate 306, apply the transfer layer UV cure resin 301 onto the adhesive layer UV cure resin 307 of the kth signal substrate 306 and then paste the (k−1)th stamper 300 to the kth signal substrate 306.

FIGS. 6(a)-6(d) steps. The (k−1)th stamper 300 and the kth signal substrate 306 bonded together in the step shown in FIGS. 3(a)-3(d) are fixed on a peeling table 600. The means of fixing can be vacuum suction in FIG. 6(a), but other means include, for example, a machine which holds the circumferential end surface of the kth signal substrate 306. Then, as shown in FIG. 6(b), a lug 610 is inserted into the central hole of the (k−1)th stamper 300 and the kth signal substrate 306 and the lug 610 is inserted into the interface between the transfer layer 303 which is part of the (k−1)th separation layer 310 and the (k−1)th stamper 300. As the end of the lug 610 is sharp, the lug 610 can be easily inserted as a wedge into the interface between the transfer layer 303 and the (k−1)th stamper 300.

As shown in FIG. 6(c), while the lug 610 is being opened outward, pressurized air 615 is introduced from the center of the peeling table 600 into the area between the transfer layer 303 and the (k−1)th stamper 300. At this time, the (k−1)th stamper 300 is pulled up using the handling means 612. Pulling it up using the handling means 612 facilitates the peeling. Finally, the (k−1)th stamper 300 is peeled off as shown in FIG. 6(d).

The (k−1)th recording multilayer film is formed on the guide grooves and pits of the (k−1)th signal recording layer transferred on the (k−1)th separation layer. Though the method of forming the (k−1)th recording multilayer film varies depending on the material, phase variation films such as GeSbTe and AgInSbTe, recording films such as magnetic films, dielectric films such as ZnS sandwiching them and metal reflecting film, etc., are formed by sputtering and vapor deposition. Furthermore, in the case of the pigment film, spin coating is used. It is only after the (k−1)th recording multilayer film is formed that the (k−1)th signal recording layer is completed. By repeating the steps shown in FIGS. 2(a)-2(b). FIGS. 3(a)-3(d) and FIGS. 6(a)-6(d) and formation of the recording multilayer film on the (k−1)th signal recording layer, a first signal substrate having n signal recording layers is created.

Figure 11:
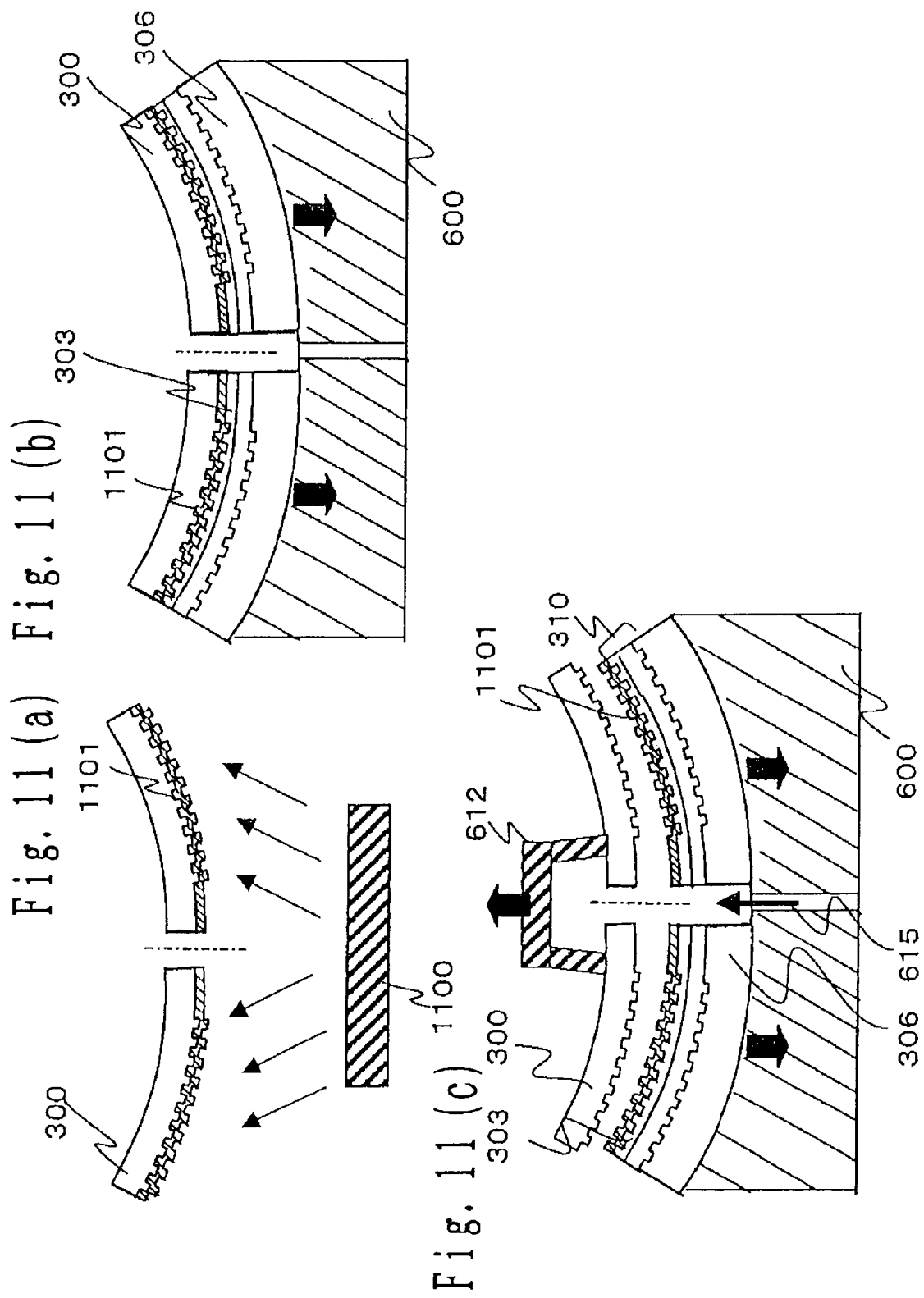
FIG. 11(a) illustrates a step of forming the (k−1)th recording multilayer film on the (k−1)th stamper using a target and using a sputtering method of the one example of the method of forming the recording multilayer film according to Embodiment 1 of the present invention.
FIG. 11(b) illustrates a step of fixing on a peeling table of the one example of the method of forming the recording multilayer film according to Embodiment 1 of the present invention.
FIG. 11(c) illustrates a step of peeling off the (k−1)th stamper using handling means of the one example of the method of forming the recording multilayer film according to Embodiment 1 of the present invention.

In addition to the above described film forming method, a method shown in FIGS. 11(a)-11(c) can also be used. This is effective when it is difficult to form the (k−1)th recording multilayer film on the guide grooves and pits of the (k−1)th signal recording layer transferred onto the (k−1)th separation layer. As shown in FIG. 11(a), the (k−1)th recording multilayer film 1101 is formed on the (k−1)th stamper 300 beforehand using a target 1100 and using a sputtering method. Here, only one target is shown, but since the (k−1)th recording multilayer film 1101 is actually made of a plurality of materials, a plurality of targets are necessary. Then, in the steps in FIGS. 3(a)-3(d), the (k−1)th separation layer 310 consisting of the transfer layer 303 and adhesive layer 308 is formed.

Then, as shown in FIG. 11(b), the (k−1)th separation layer 310 is fixed on the peeling table 600 and as shown in FIG. 11(c), the (k−1)th stamper 300 is peeled using the handling means 612. The procedure up to the peeling is the same as that shown in FIG. 6, and therefore it is omitted here. At this time, the (k−1)th stamper 300 is peeled off the (k−1)th recording multilayer film 1101 and the (k−1)th recording multilayer film 1101 is moved onto the (k−1)th separation layer 310. Guide grooves and pits are formed on the transfer layer 303 and at the same time the (k−1)th recording multilayer film 1101 is also formed. Using this step makes it possible to form the (k−1)th separation layer onto the kth signal substrate and at the same time form the (k−1)th recording multilayer film and there is an expectation of shortening of a tact time.

Figure 7B:
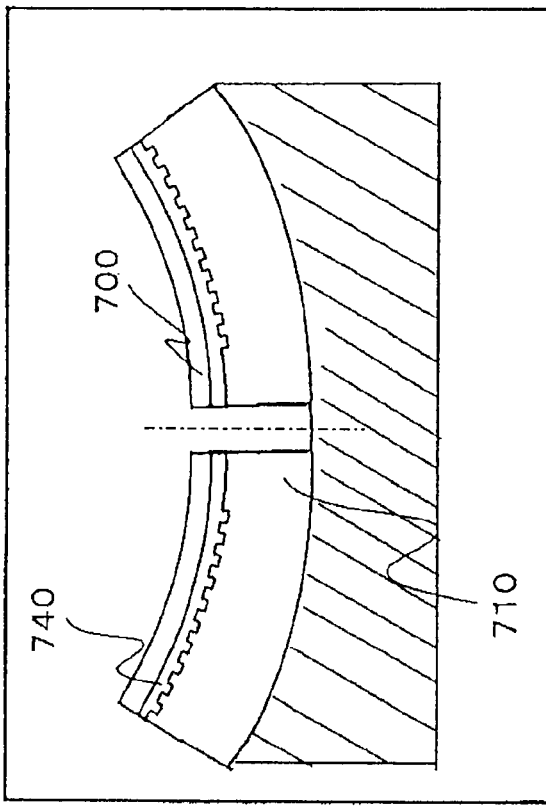
FIG. 7(b) illustrates the method of forming the transparent cover layer according to Embodiment 1 of the present invention, which is a method of adhering of a film using a pressure-sensitive adhesive and forming a cover layer.
Figure 7A:
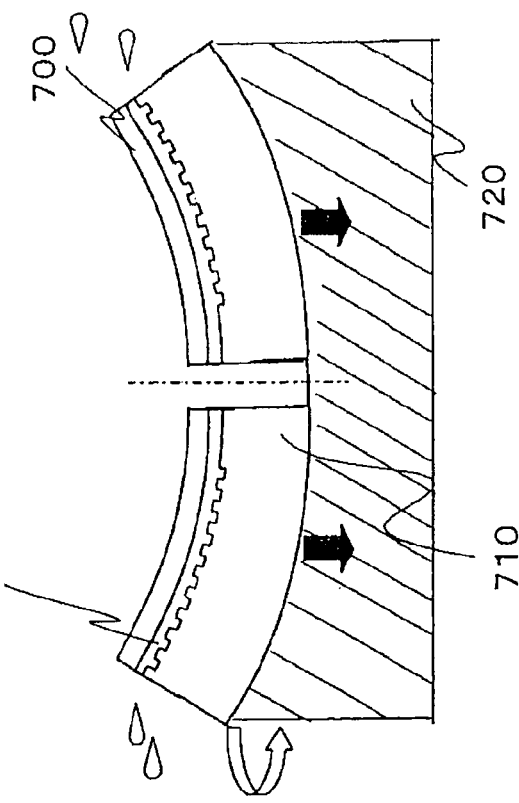
FIG. 7(a) illustrates the method of forming a transparent cover layer according to Embodiment 1 of the present invention, which is a method of arranging an adhesive material between a first signal substrate and a film and throwing off adhesive material by spinning.
Figure 7C:
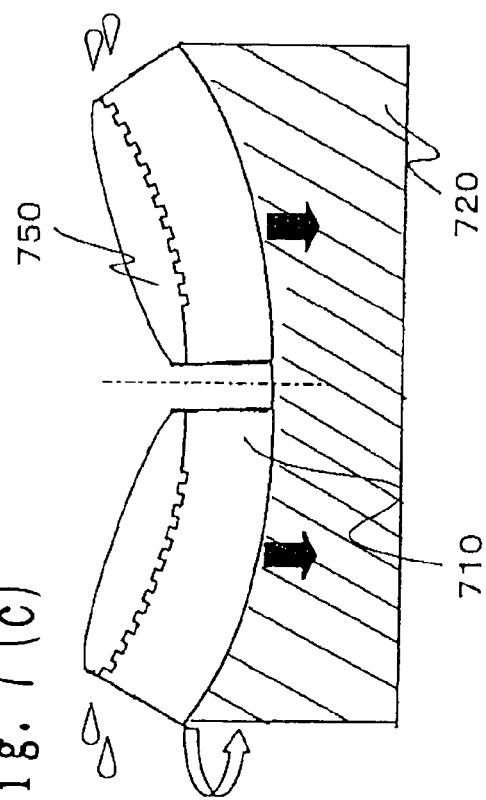
FIG. 7(c) illustrates the method of forming the transparent cover layer according to Embodiment 1 of the present invention, which is a method of applying a spin coat to the cover material without using any film.

FIGS. 7(*a*)-7(*c*) show examples of steps of creating a transparent cover layer on the first signal recording layer. In the case shown here, the thickness of the transparent cover layer is 100 microns. In FIG. 7(*a*), a film 700 of 90 microns in thickness is bonded on the table 720 using an adhesive layer 730 of 10 microns in thickness by spin coating to form the cover layer. As the material of the film 700, polycarbonate, olefin resin or norbornen-based resin, etc., can be used. As the adhesive layer 730, UV cure resin, radiation-cured material such as heat-cured resin can be used.

As the bonding procedure, as shown in FIG. 7(*a*) a method of arranging an adhesive material between a first signal substrate 710 and film 700 and throwing it off by spinning, a method of superimposing the first signal substrate 710 on the film 700 and spinning or a method of applying an adhesive material to the entire surface of at least one of the first signal substrate 710 and film 700 beforehand and pasting them together in vacuum, etc., is available. In any method, after the first signal substrate 710 and the film 700 are overlapped through the adhesive material, they need to be cured.

FIG. 7(*b*) shows a method of bonding the film 700 using a pressure-sensitive adhesive 740 and forming a cover layer. In this case, the thickness of the pressure-sensitive adhesive 740 is 20 to 30 microns and the thickness of the film 700 obtained by subtracting the thickness of the pressure-sensitive adhesive 740 from 100 microns is used. The bonding method used is, for example, a method of overlapping the film 700 with the pressure-sensitive adhesive 740 in the chamber 745 with a reduced pressure shown in FIG. 7(*b*). After overlapping them, the film surface is pressed with a high-pressure compressed air to secure the bonding. In addition to this method, a method of pasting using a roller in the atmosphere or under a reduced pressure may also be used.

FIG. 7(*c*) shows a method whereby a cover material 750 is applied by spin coating without using any film. Optimizing the condition of supplying the cover material 750 and the condition of spin rotation makes it possible to form a uniform transparent cover layer of 100 microns in thickness. Using the above described methods shown in FIGS. 7(*a*)-7(*c*), the transparent cover layer is formed and a multilayer optical information recording medium is completed.

In above described Embodiment 1, the plastic (k−1)th stamper of 1.1 mm in thickness is used, but any plastic stamper that has a thickness of at least 0.5 mm is acceptable. If the stamper has a thickness of about 0.5 mm or more, since it also has rigidity, its shape can be easily controlled according to the molding condition using the injection molding method and it can be easily handled, which is suited to improving productivity.

Furthermore, Embodiment 1 has described the case where the (k−1)th separation layer is made of two materials, but it is also applicable to a case where the (k−1)th separation layer is made of three or more materials. Furthermore, Embodiment 1 has been described using UV cure resin, but it is also possible to use a radiation cure material including a heat cure material.

Embodiment 2

Figure 8A:
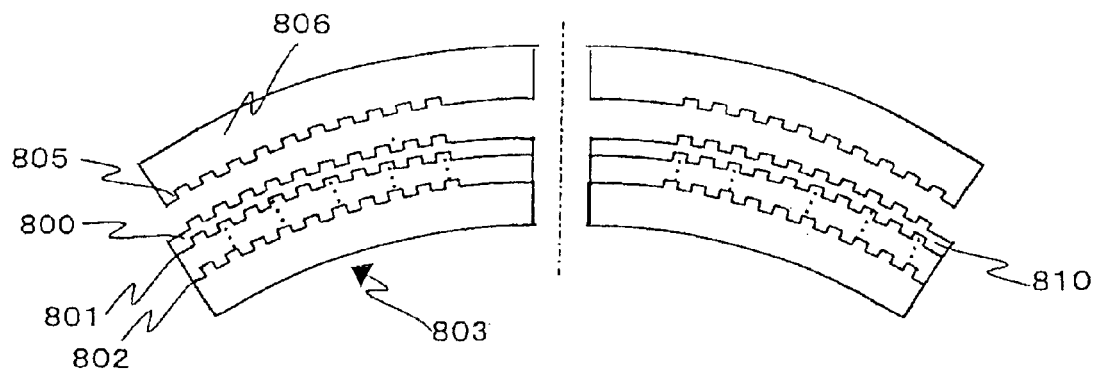
FIG. 8(a) is a schematic view showing a step of preparing the kth signal substrate and the (k−1)th stamper of a method of manufacturing a multilayer optical information recording medium according to Embodiment 2 of the present invention.
Figure 8B:
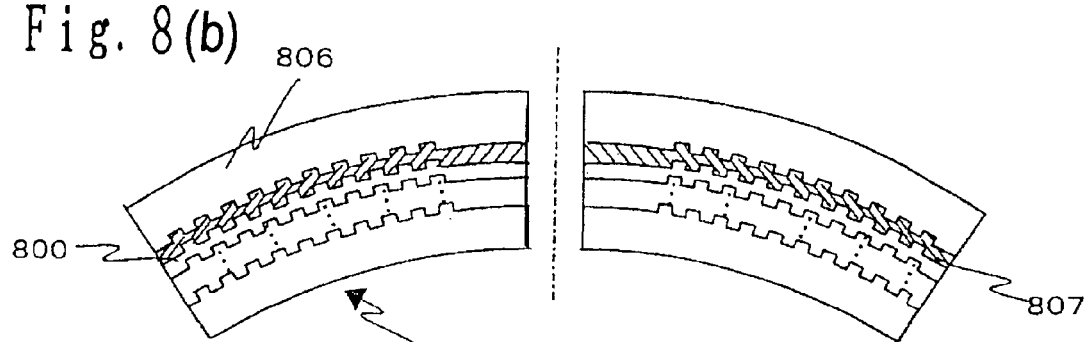
FIG. 8(b) illustrates a step of forming a separation layer between the (k−1)th signal recording layer and the kth signal recording layer of the method of manufacturing the multilayer optical information recording medium according to Embodiment 2 of the present invention.
Figure 8C:
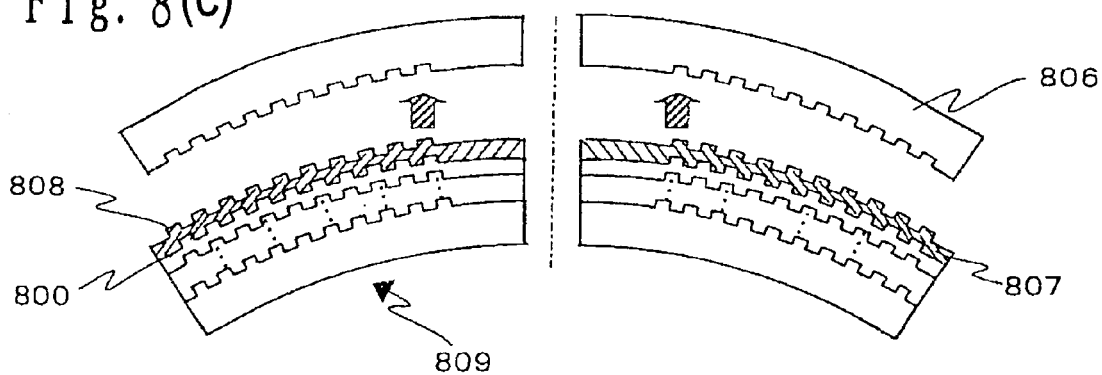
FIG. 8(c) illustrates a step of performing peeling from the interface between the transferred (k−1)th signal recording layer on the (k−1)th separation layer and the (k−1)th stamper of the method of manufacturing the multilayer optical information recording medium according to Embodiment 2 of the present invention.
Figure 9:
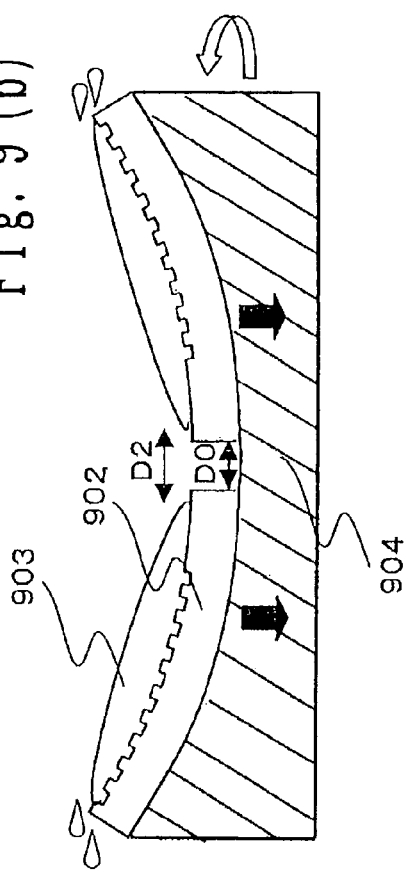
FIG. 9(a) illustrates a step of putting the kth signal substrate and a pressure-sensitive adhesive into a chamber and vacuuming inside the chamber of the method of forming a separation layer according to Embodiment 2 of the present invention.
FIG. 9(b) illustrates a step of coating transfer layer UV cure resin to the surface provided with guide grooves and pits of the (k−1)th signal recording layer of the method of forming a separation layer according to Embodiment 2 of the present invention.
FIG. 9(c) illustrates a step of superimposing the (k−1)th stamper on the kth signal substrate of the method of forming a separation layer according to Embodiment 2 of the present invention.
FIG. 9(d) illustrates a step of irradiating UV rays and curing uncured transfer layer UV cure resin of the method of forming a separation layer according to Embodiment 2 of the present invention.
Figure 9:
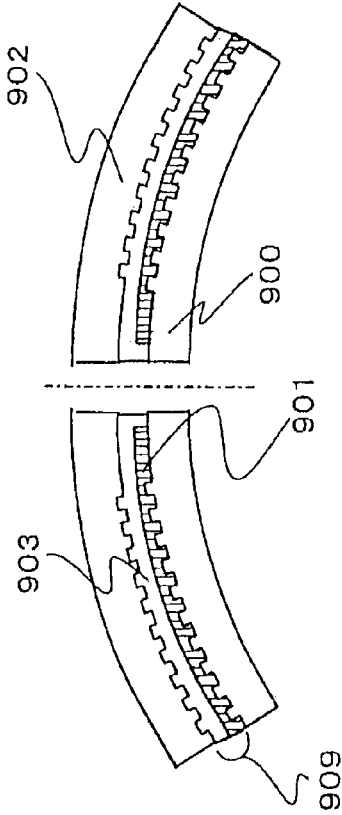
Figure 9:
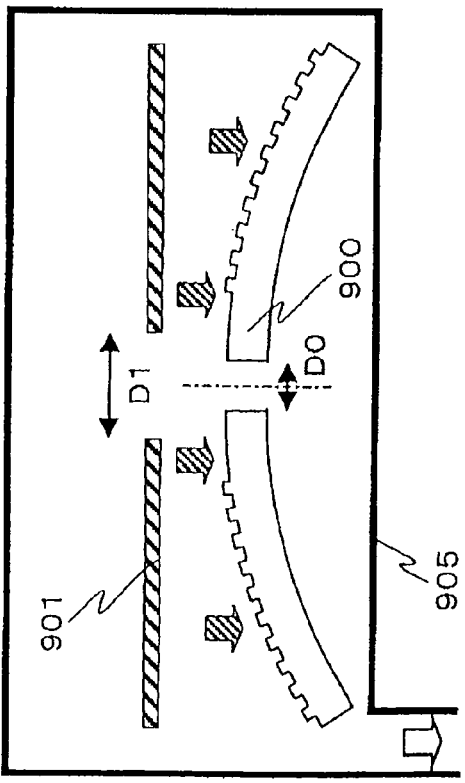
Figure 9:
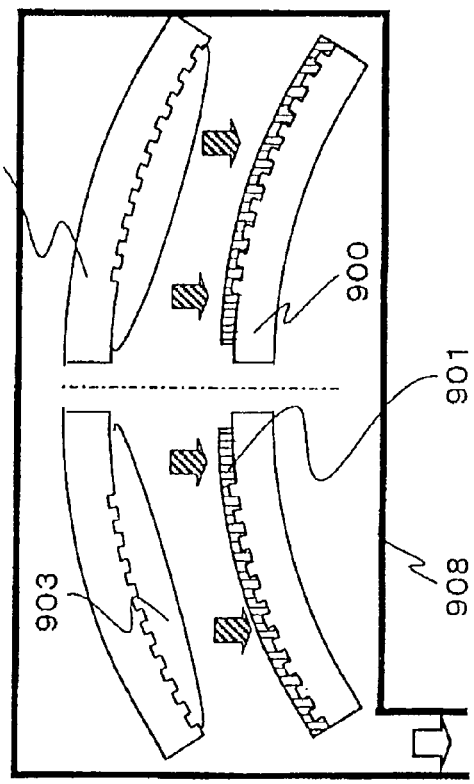

Embodiment 2 of the method of manufacturing a multilayer optical information recording medium according to the present invention will be explained. FIGS. 9(*a*)-8(*c*) show a case with warpage opposite to that in Embodiment 1, that is, a case where the kth signal substrate is warped so as to wrap around the surface opposite to the kth signal recording layer. As with FIGS. 1(*a*)-1(*c*), both the kth signal substrate and the (k−1)th stamper in FIGS. 8(*a*)-8(*c*) have a disk shape and have a central hole in the center.

First, as shown in FIG. 8(*a*), the kth signal substrate 803 is provided with not only the kth signal recording layer 800 on the surface of the kth separation layer 810 but also a total of (n-k−1) signal recording layers from the (k−1)th signal recording layer 801 to the nth signal recording layer 802. As in the case of Embodiment 1, the signal recording layer consists of guide grooves for guiding recording light or reproducing light when information is recorded in or reproduced from the multilayer optical information recording medium or pits indicating address information, phase variation film such as GeSbTe or AgInSbTe, recording film represented by magnetic film and pigment film and recording multilayer film made of dielectric films such as ZnS sandwiching them or reflecting film.

On the other hand, the (k−1)th stamper 806 having the guide grooves and pits 805 of the (k−1)th signal recording layer on the surface is also prepared. The (k−1)th stamper 806 is formed by measuring the surface shapes of one or a plurality of kth signal substrates 803 manufactured currently or in the past as in the case of warpage measuring means 1401 which will be shown in FIGS. 14(*a*)-14(*d*) of Embodiment 5 as will be described later, shaping the surface with guide grooves and/or pits 805 of the (k−1)th signal recording layer of the (k−1)th stamper 806 to conform to the surface shape of the kth signal substrate 803 based on the measurement result. That is, the (k−1)th stamper 806 is in a shape parallel to the kth signal substrate 803.

Therefore, the (k−1)th stamper 806 and the kth signal substrate 803 are shaped parallel to each other as shown in the figure and the (k−1)th stamper 806 is warped so as to wrap around the guide grooves and pits 805 of the (k−1)th signal recording layer. That is, the guide grooves and pits 805 of the (k−1)th signal recording layer and the kth signal recording layer 800 are shaped parallel to each other and the distance is uniform in the radial direction and within the surface. That is, the kth signal recording layer 800 of the kth signal substrate 803 and the surface with the guide grooves and/or pits 805 of the (k−1)th signal recording layer are shaped so as to have substantially the same radius of curvature.

Then, as shown in FIG. 8(*b*), a (k−1)th separation layer 807 is formed between the guide grooves and pits 805 of the (k−1)th signal recording layer and the kth signal recording layer 800. At this time, the (k−1)th stamper side of the (k−1)th separation layer 807 needs to be formed so as to fit into the guide grooves and pits 805 of the (k−1)th signal recording layer. In FIG. 8(*a*), since the distance between the guide grooves and pits 805 of the (k−1)th signal recording layer and the kth signal recording layer 800 is uniform in the radial direction and within the surface, the thickness of the (k−1)th separation layer is uniform. The (k−1)th separation layer 807 need not only be made of one material but also may be made up of a plurality of layers made of different materials. For example, when the layer of the (k−1)th separation layer 807 which contacts the guide grooves and pits 805 of the (k−1)th signal recording layer is regarded as a transfer layer, if a liquid material with a curing characteristic is used as the transfer layer, it is easily fitted into the guide grooves and pits 805 of the (k−1)th signal recording layer and transferability can be improved. In this case, the transfer layer is cured and the (k−1)th separation layer 807 is completed.

Then, as shown in FIG. 8(*c*), peeling is performed from the interface between the guide grooves and pits 808 of the transferred (k−1)th signal recording layer on the (k−1)th separation layer 807 and the (k−1)th stamper 806.

As shown above, even if the warpage of the kth signal substrate is different from that of Embodiment 1, providing the (k−1)th stamper with reverse warpage makes the distance between the kth signal substrate and the (k−1)th stamper uniform in the radial direction, so as to keep the thickness of the (k−1)th separation layer uniform. For example, if the (k−1)th stamper is made of plastic as in the case of Embodiment 1, the (k−1)th stamper can be created using the injection molding method shown in FIGS. 2(a)-2(b). By setting the temperature of the metal die mirrored surface A in FIGS. 2(a)-2(b) to a temperature higher than that of the metal die mirrored surface B, the (k−1)th stamper 204 is shaped so as to wrap around the surface 205 on which the guide grooves and pits are formed after it is removed from the molding metal die 200.

Then, a specific example of the method of forming the (k−1)th separation layer shown in FIG. 8(b) will be explained. FIGS. 9(a)-9(d) show examples of forming the (k−1)th separation layer of 30 microns in thickness using a pressure-sensitive adhesive and a transfer layer. FIGS. 9(a)-9(d) show a method of using a pressure-sensitive adhesive as part of the (k−1)th separation layer. The pressure-sensitive adhesive has excellent thickness accuracy because it has a semi-solid film-like shape. On the other hand, having a very high viscosity, it is difficult for the pressure-sensitive adhesive to transfer the guide grooves and pits of the (k−1)th stamper. This formation method uses a transfer layer with a low viscosity separately.

First, as shown in FIG. 9(a), a kth signal substrate 900 and a pressure-sensitive adhesive 901 of 25 microns in thickness are put in a chamber 905 and the chamber 905 is vacuum-sealed. As the degree of vacuum, for example, a range of about 1 to 100 hPa is appropriate. Then, the pressure-sensitive adhesive 901 is superimposed on the surface of the kth signal recording layer of the kth signal substrate 900. At this time, it is preferable to superimpose the pressure-sensitive adhesive 901 gradually starting from the central area outward. By doing so, it is possible to suppress the increase of stress in the kth signal substrate 900 caused by the superimposition of the pressure-sensitive adhesive 901. Furthermore, the pressure-sensitive adhesive 901 has a central hole having a diameter of D1. D1 is greater than the diameter of the central hole D0 of the kth signal substrate. After the superimposition, the kth signal substrate and the pressure-sensitive adhesive are taken out into the atmosphere and the pressure-sensitive adhesive may be pressed under a high-pressure compressed air to secure the adhesion.

Simultaneously with FIG. 9(a), the (k−1)th stamper 902 is fixed onto a table 904 as shown in FIG. 9(b), a transfer layer UV cure resin 903 is coated over the surface with guide grooves and pits of the (k−1)th signal recording layer. Here, application by spin coating is shown as an example. As the transfer layer UV cure resin 903, acrylic resin which radically reacts with irradiation with UV rays is preferable as in the case of Embodiment 1. Acrylic UV cure resin with a viscosity of 200 MPa·s which can be easily peeled off the plastic (e.g., polycarbonate, olefin resin, etc.) (k−1)th stamper 902 is used. The transfer layer having a viscosity of 1 to 1000 MPa·s can well fit into projections and depressions of guide grooves and pits on the stamper. Furthermore, through spinning at a speed of 4000 rpm for 5 seconds, a transfer layer of approximately 8 microns in thickness was obtained. Furthermore, the inside diameter of the coated transfer layer UV cure resin 903 is D2 which is smaller than diameter D0 of the central hole of the (k−1)th stamper 902.

Then, as shown in FIG. 9(c), the (k−1)th stamper 902 coated with the transfer layer UV cure resin 903 is superimposed on the kth signal substrate 900 on which the pressure-sensitive adhesive 901 is superimposed in the chamber 908. At this time, suppose the degree of vacuum in the chamber 908 is 1 to 100 hPa. Since D2<D1, the pressure-sensitive adhesive 901 will never contact the (k−1)th stamper 902. After the formation of the (k−1)th separation layer, this is intended to prevent the pressure-sensitive adhesive 901 from directly contacting the (k−1)th stamper 902 making it impossible to peel off the (k−1)th stamper 902 in the step of peeling the (k−1)th stamper 902.

Since the transfer layer UV cure resin 903 has a low viscosity, it spread when super imposed and a total average thickness of the transfer layer UV cure resin 903 and pressure-sensitive adhesive 901 became 30 microns. After the superimposition, it is also possible to take out the kth signal substrate and the (k−1)th stamper into the atmosphere, crush bubbles produced when the kth signal substrate and the (k−1)th stamper are pressed against each other with a high-pressure compressed air or secure the adhesion.

Finally as shown in FIG. 9(d), the uncured transfer layer UV cure resin 903 is cured by UV rays using a UV lamp 910. As a result of the cure, a (k−1)th separation layer 909 which consists of the pressure-sensitive adhesive 901 and transfer layer UV cure resin 903 is formed. Since UV rays penetrate to a certain degree if the (k−1)th stamper 902 is transparent, the transfer layer UV cure resin 903 can be well cured. As the UV lamp, a metal halide lamp, high pressure mercury lamp or xenon lamp, etc., can be used.

What is important in the steps shown in FIGS. 9(a)-9(d) is the selection of materials for the pressure-sensitive adhesive and transfer UV cure resin. The pressure-sensitive adhesive needs to have strength of adhesion to the kth signal recording layer and cured UV resin for transfer layer. On the other hand, it goes without saying that it is important that the transfer UV cure resin be easily peeled from the (k−1)th stamper after the cure. After the steps shown in FIGS. 9(a)-9(d), it is possible to perform the peeling step shown in FIGS. 6(a)-6(d) as in the case of Embodiment 1.

In FIGS. 9(a)-9(d), the transfer layer UV cure resin 903 is applied to the (k−1)th stamper 902, but it is also possible to apply the transfer layer UV cure resin 903 to the pressure-sensitive adhesive 901 superimposed on the kth signal substrate 900. Furthermore, in FIG. 9, the pressure-sensitive adhesive 901 is superimposed on the kth signal substrate 900, but instead of this, it is also possible to apply the transfer layer UV cure resin 903 to the (k−1)th stamper 902 and then superimpose the pressure-sensitive adhesive 901 on the (k−1)th stamper 902 to which the transfer layer UV cure resin 903 is applied and then paste the kth signal substrate 900 to the (k−1)th stamper 902. It is also possible to use the steps in FIG. 3(c), use the transfer UV cure resin 903 instead of the adhesive layer UV cure resin 307, rotate both the (k−1)th stamper 902 and the kth signal substrate 900 to which the pressure-sensitive adhesive 901 is added to paste them together. When the strength of adhesion between the pressure-sensitive adhesive 901 and transfer layer UV cure resin 903 after the cure is insufficient, it is also possible to arrange another adhesive capable of obtaining sufficient strength of adhesion to the transfer layer UV cure resin 903 after the cure on the pressure-sensitive adhesive 901.

Figure 10:
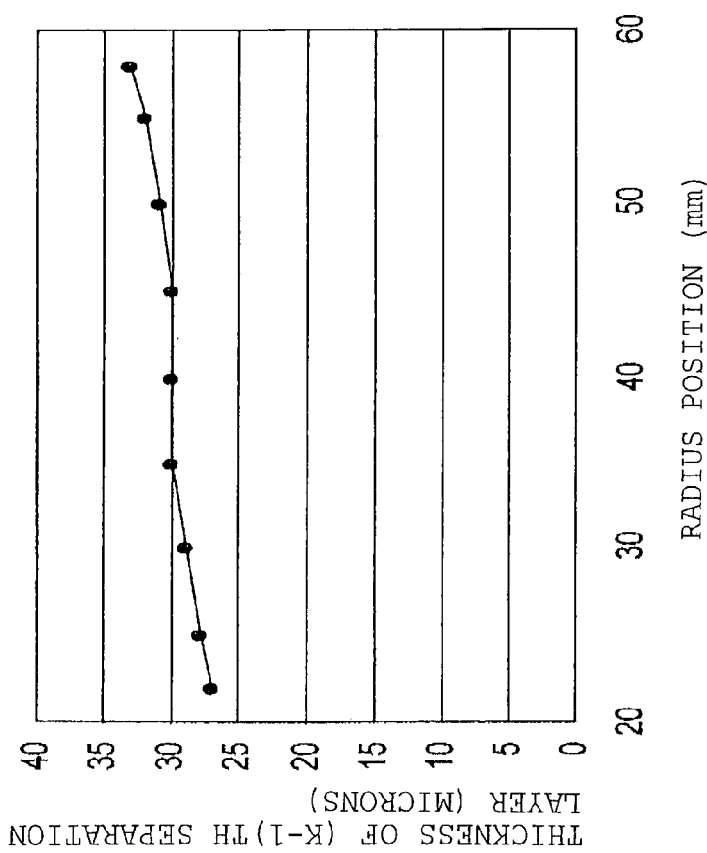
FIG. 10(a) illustrates a thickness distribution of the separation layer formed using the method of forming a separation layer according to Embodiment 2 of the present invention.
FIG. 10(b) illustrates a thickness distribution of the separation layer formed using the conventional method of forming a separation layer.
Figure 10:
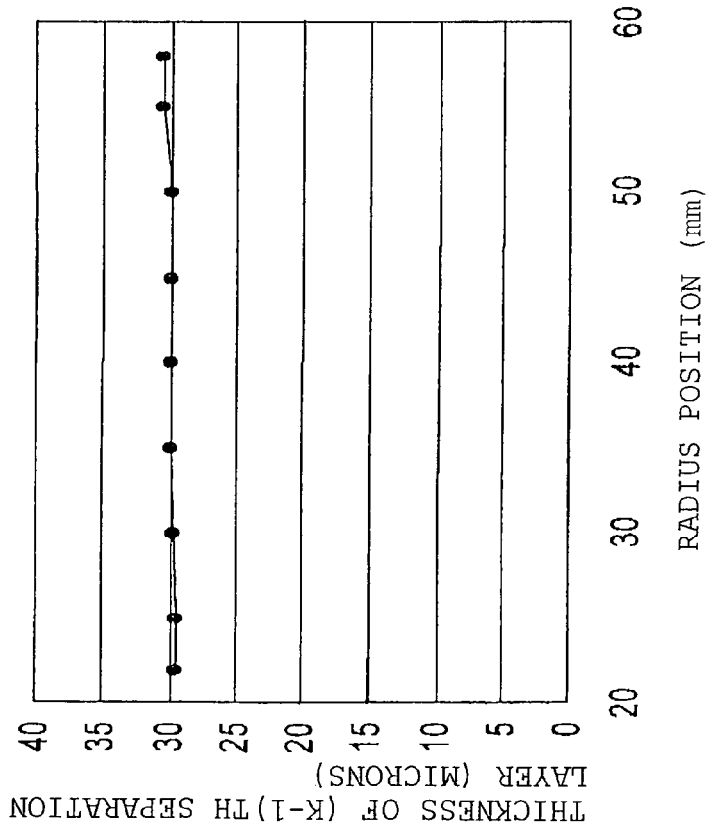

FIG. 10(a) shows a thickness distribution of the (k−1)th separation layer 909 formed using the methods in FIGS. 8(a)-8(c) and FIGS. 9(a)-9(d). There is a distribution of about 1 micron of about 29.5 to about 30.5 microns from the inside radius to the outside radius. This is due to the thickness variation of the transfer layer UV cure resin 903 by spin coating. This is more uniform than the (k−1)th separation layer of Embodiment 1 shown in FIG. 4(a). This is because a pressure-sensitive adhesive with high thickness accuracy is used in Embodiment 2.

FIG. 10(b) shows a case where the (k−1)th separation layer is formed using the conventional flat (k−1)th stamper 500 as shown in FIGS. 5(a)-5(d) according to the method in FIGS. 9(a)-9(d). The distance between the kth signal substrate and the (k−1)th stamper is small at the inside radius and large at the outside radius, and therefore the thickness of the (k−1)th separation layer tends to increase from the inside radius to the outside radius and a distribution of about 6 microns between about 27 and about 33 microns is produced. In this way, FIGS. 8(a)-8(c) and FIGS. 9(a)-(d) are effective for uniformity in the thickness of the (k−1)th separation layer.

In addition to the adhesion method of the pressure-sensitive adhesive to the kth signal substrate in this Embodiment 2 ((FIG. 9(a)), a method of pasting using a roller in the atmosphere or under a reduced pressure is also available.

Furthermore, in Embodiment 2, it is also possible to create the (k−1)th separation layer of a uniform thickness using the adhesive layer UV cure resin shown in Embodiment 1 according to the method shown in FIGS. 3(a)-3(d) instead of the pressure-sensitive adhesive. On the contrary, when the kth signal substrate is warped so as to wrap around the kth signal recording layer as in the case of Embodiment 1, it is also possible to apply the pressure-sensitive adhesive shown in FIGS. 9(a)-9(d).

In above described Embodiment 2, the plastic (k−1)th stamper of 1.1 mm in thickness was used, but any plastic stamper that has a thickness of at least about 0.5 mm is acceptable. If the stamper has a thickness of about 0.5 mm or more, since it also has rigidity, its shape can be easily controlled according to the molding condition using the injection molding method and it can be easily handled, which is suited to improving productivity.

Furthermore, Embodiment 2 has described the case where the (k−1)th separation layer is made of two materials, but it is also applicable to a case where the (k−1)th separation layer is made of three or more materials. Furthermore, Embodiment 2 has been described using UV cure resin, but it is also possible to use a radiation cure material including a heat cure material.

Embodiment 3

Figure 12:
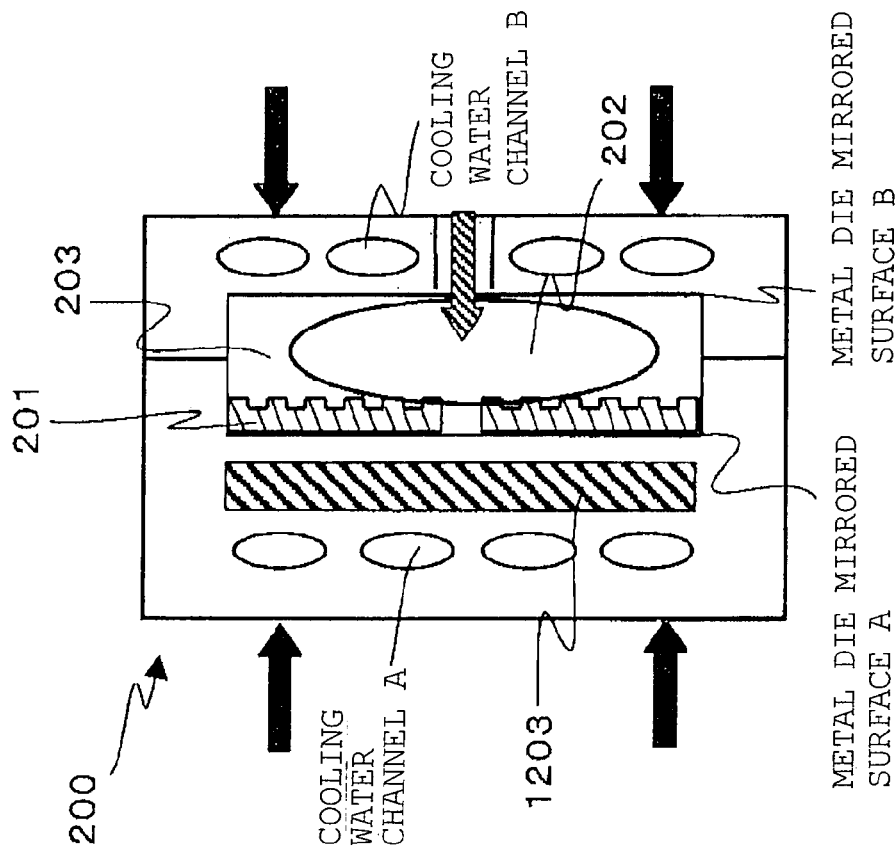
FIG. 12(a) illustrates a case where a heat insulator is arranged between a master stamper and a metal die mirrored surface A of the one example when the (k−1)th stamper is formed using an injection molding method according to Embodiment 3 of the present invention.
FIG. 12(b) illustrates a molding metal die with the heat insulator incorporated behind the metal die mirrored surface A of the one example when the (k−1)th stamper is formed using the injection molding method according to Embodiment 3 of the present invention.
Figure 12:
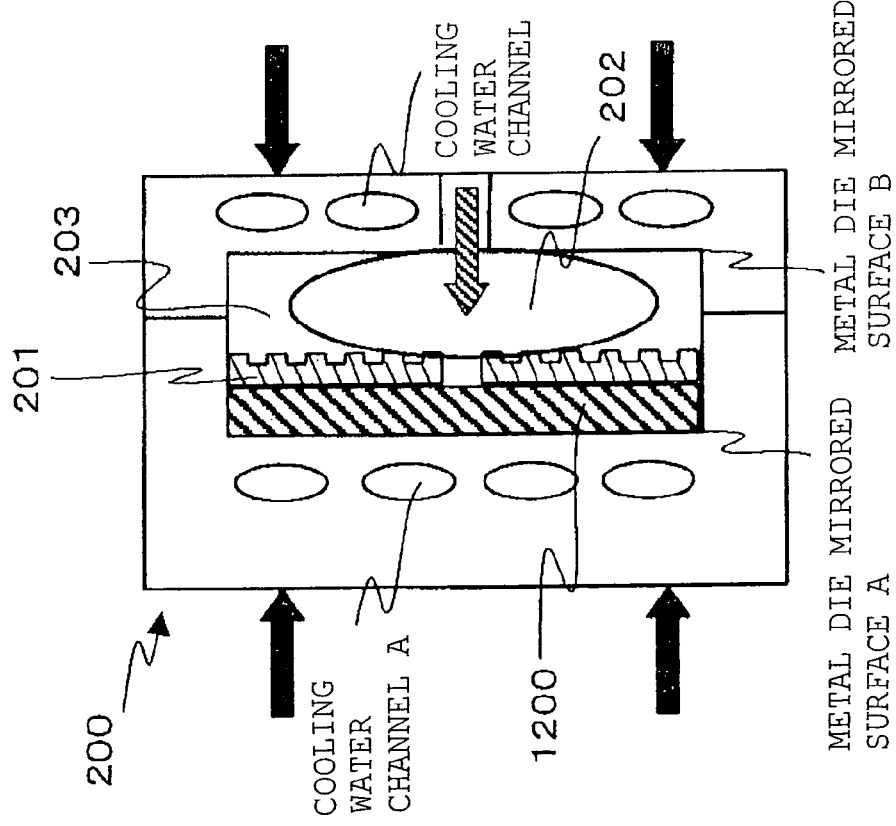

Here, an alternative method for the method of manufacturing the (k−1)th stamper shown in FIGS. 2(a)-2(b) will be explained. FIGS. 12(a)-12(b) are schematic views of a molding metal die provided with a heat insulator. This is intended to warp the (k−1)th stamper so as to wrap around the surface opposite to the surface on which guide grooves and pits are provided.

FIG. 12(a) shows a case where a heat insulator 1200 is provided between a master stamper 201 and a metal die mirrored surface A. Cooling water flows through a cooling water channel A and a cooling water channel B to cool melted polycarbonate 202 introduced inside a cavity 203 of a molding metal die 200. By inserting the heat insulator 1200, the metal die mirrored surface B side is cooled according to the temperature of the cooling water that flows through the cooling water channel B, while for the master stamper 201 side, the temperature of the melted polycarbonate 202 is hardly cooled and therefore the master stamper 201 is warped more than the (k−1)th stamper molded with the molding metal die shown in FIGS. 2(a)-2(b). Cooling water can be flown through the cooling water channel A at a temperature necessary and enough to prevent the heat insulator 1200 from being broken by heat. FIG. 12(b) shows a molding metal die with a heat insulator 1203 incorporated behind the metal die mirrored surface A. With this configuration, it is also possible to achieve the same effect.

Moreover, in addition to FIGS. 12(a)-12(b), it is also possible to incorporate a heat insulator behind the metal die mirrored surface B. In this case, the temperature of the surface of the metal die mirrored surface B tends to exceed the temperature on the master stamper side. For this reason, the molded (k−1)th stamper is warped so as to wrap around the surface opposite to the surface with guide grooves and pits.

Moreover, it is also possible to incorporate the heat insulator not only on one side of the metal die mirrored surface of the above described pair of molding metal dies but also on both metal die mirrored surfaces.

In above described Embodiment 3, the plastic (k−1)th stamper of 1.1 mm in thickness is used, but any plastic stamper that has a thickness of at least about 0.5 mm is acceptable. If the stamper has a thickness of about 0.5 mm or more, since it also has rigidity, its shape can be easily controlled according to the molding condition using the injection molding method and it can be easily handled, which is suited to improving productivity.

Embodiment 4

Embodiment 4 will describe the method of creating a metal (k−1)th stamper. Since metal has a relatively high degree of hardness, it is possible to suppress damage or deformation which may occur to the (k−1)th stamper when the (k−1)th stamper is peeled off the kth signal substrate and is therefore effective. Projections and depressions of guide grooves and pits must be switched round between the master stamper 201 and the (k−1)th stamper also shown in FIGS. 2(a)-2(b) and FIGS. 12(a)-12(b). Therefore, it is possible to create a metal (k−1)th stamper using the master stamper 201.

A master stamper is generally created using a glass master original disk having a shape whose projections and depressions are reverse to the guide grooves and pits on the master stamper. The surface of the glass master original disk is provided with projections and depressions which are guide grooves and pits formed on its glass surface using a photoresist. First, a photoresist is applied uniformly to the surface of a glass plate and the photoresist is exposed to condensed laser with UV to far-ultraviolet wavelengths and further electronic rays into the shapes of guide grooves and pits. The exposed photoresist area is removed in a developing step and projections and depressions such as guide grooves and pits are formed on the glass master original disk.

Then, a nickel thin film is formed on the surface of guide grooves and pits of the glass master original disk by means of vapor deposition or sputtering and nickel is deposited by electrocasting using the nickel thin film as an electrode. Generally, nickel is deposited to a thickness of 0.3 mm and a nickel plate is created on the surface of the glass master original disk. When the nickel plate is peeled off the glass master original disk, a master stamper having projections and depressions (guide grooves and pits) which are reversed projections and depressions (guide grooves and pits) on the glass master original disk is formed on the nickel plate.

The method of creating a nickel (k−1)th stamper from the nickel master stamper will be shown below.

(1) Surface Oxidation Treatment of Surface with Projections and Depressions (Guide Grooves and Pits) of Master Stamper The master stamper is immersed in an aqueous solution of sodium hydroxide and used as an anode with a current of 20 A flowing for 60 seconds. In this way, an oxide film with the surface with projections and depressions of the master stamper subjected to oxidation treatment is formed.

(2) Formation of Nickel (k−1)th Stamper on Surface with Projections and Depressions of Master Stamper through Electrocasting The entire master stamper is immersed in an electrocasting bath and this is used as a negative electrode to perform electrocasting. An electrocasting bath of nickel sulfamate (concentration: 550 g/L) and boric acid (concentration: 31 g/L) is used. The pH value, temperature and current density during electrocasting of the electrocasting bath are adjusted as required. Nickel is formed to a thickness of about 0.3 mm on a master stamper by electrocasting and about 0.3 mm nickel (k−1)th stamper is obtained.

(3) Peeling and Punching of Nickel (k−1)th Stamper

The nickel (k−1)th stamper is peeled off the master stamper and punched out to a necessary outside radius and inside radius.

Figure 13A:
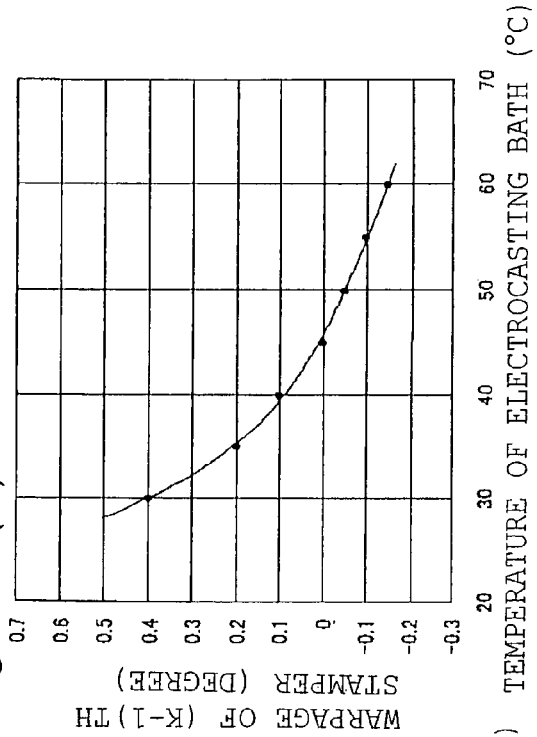
FIG. 13(a) illustrates a relationship between a cathode current density and the degree of warpage of the (k−1)th stamper of the conditions when the shape of the metal (k−1)th stamper is controlled under electrocasting conditions according to Embodiment 4 of the present invention.
Figure 13B:
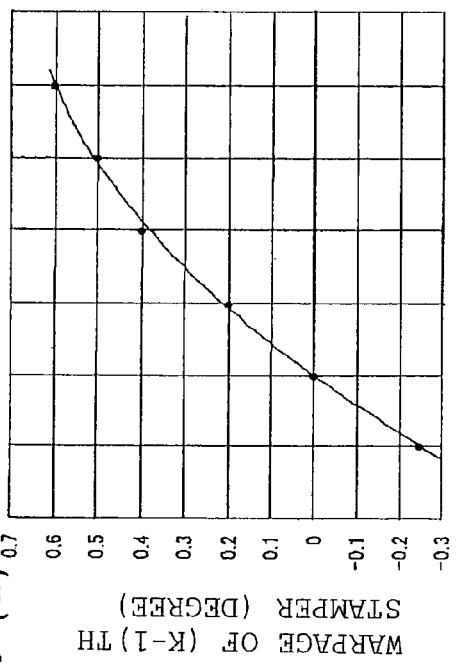
FIG. 13(b) illustrates a relationship between a temperature of an electrocasting bath and the degree of warpage of the (k−1)th stamper of the conditions when the shape of the metal (k−1)th stamper is controlled under electrocasting conditions according to Embodiment 4 of the present invention.
Figure 13C:
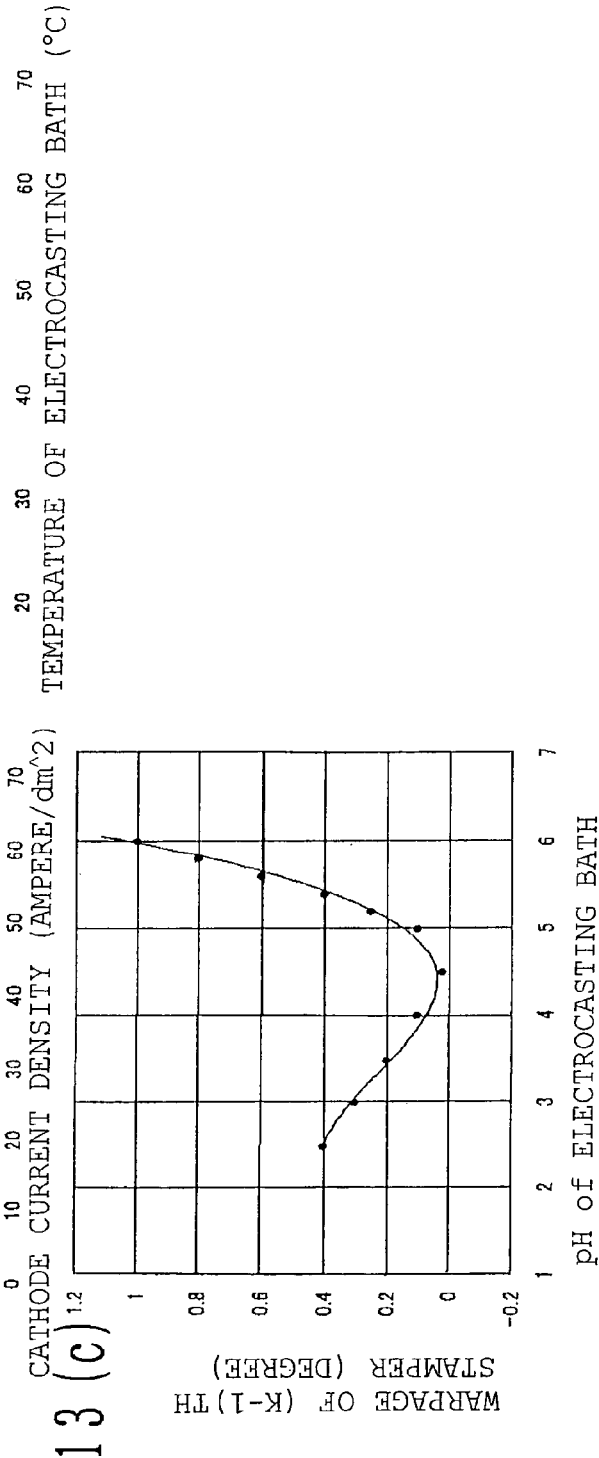
FIG. 13(c) illustrates a relationship between a pH of the electrocasting bath and the degree of warpage of the (k−1)th stamper of the conditions when the shape of the metal (k−1)th stamper is controlled under electrocasting conditions according to Embodiment 4 of the present invention.

The method of creating the (k−1)th stamper has been presented briefly so far. To control the warpage of the metal (k−1)th stamper according to the shape of the kth signal substrate, the pH value, temperature and current density during electrocasting of the electrocasting bath in (2) above can be controlled. FIGS. 13(a)-13(c) show variations of warpage of the (k−1)th stamper corresponding to parameters when the (k−1)th stamper is created by changing the current density, temperature of the electrocasting bath and pH value during electrocasting. Here, + in the warpage direction means that the (k−1)th stamper is warped opposite to the surface with projections and depressions of the (k−1)th stamper, whereas − in the warpage direction means that the (k−1)th stamper is warped according to the surface with projections and depressions of the (k−1)th stamper. The magnitude of warpage is indicated with an angle formed by a tangential line of the (k−1)th stamper with respect to the radial direction of the (k−1)th stamper.

As shown in FIG. 13(a), the current density changes between + warpage and − warpage with 20 amperes/dm^2 as the border. In FIG. 13(b), warpage is + when the temperature of the electrocasting bath is lower than about 45° C., whereas warpage is − when the temperature of the electrocasting bath is higher than about 45° C. In the case of pH of the electrocasting bath in FIG. 13(c), warpage reaches a minimum with about pH 4.5, that is, the (k−1)th stamper becomes flat and warpage is + as it goes away from the minimum value. As shown above, when the (k−1)th stamper is created through electrocasting, if electrocasting is performed by controlling at least one of current density during electrocasting, temperature of the electrocasting bath and pH value, it is possible to control warpage of the (k−1)th stamper. With these parameters, it is possible to create the (k−1)th stamper in a shape parallel to the kth signal substrate.

For the metal (k−1)th stamper created in the above steps, it is possible to form a separation layer in a space with the kth signal substrate using the method shown in FIGS. 3(a)-3(d) and FIGS. 9(a)-9(d). However, when the separation layer is formed, the metal (k−1)th stamper is opaque and has no UV permeability, and therefore it is necessary to use radiation rays such as far-infrared rays for curing using a radiation-cured material such as a heat cure material instead of the adhesive layer UV cure resin 307 or transfer layer UV cure resin 903. Furthermore, a pressure-sensitive adhesive can also be used instead of the adhesive layer UV cure resin 307.

After the separation layer is formed, peeling off the kth signal substrate is possible using the method shown in FIG. 6.

Furthermore, nickel is used as metal in Embodiment 4, but any other metal can be used as the material if it allows at least electrocasting.

Embodiment 5

An apparatus of manufacturing a multilayer optical information recording medium will be explained as Embodiment 5. The manufacturing apparatus comprises shape maintaining means of arranging the kth signal substrate and the (k−1)th stamper in such a way that the kth signal recording layer and the surface with guide grooves and pits of the (k−1)th signal recording layer facing each other and maintaining the shape so that the (k−1)th stamper and the kth signal substrate are shaped parallel to each other, separation layer forming means of, when at least one of the (k−1)th stamper and the kth signal substrate is maintained by the shape maintaining means in a shape parallel to each other, forming the (k−1)th separation layer between the kth signal recording layer and the guide grooves and pits of the (k−1)th signal recording layer and peeling means of peeling the (k−1)th stamper from the interface between the (k−1)th separation layer and the (k−1)th stamper. FIG. 14 and FIG. 15 show examples of the shape maintaining means and the separation layer forming means.

The separation layer forming means of this embodiment is an example of the signal recording layer forming means of the present invention.

FIGS. 14(a)-14(d) are examples of cases where the shape maintaining means is an arm. A flat (k−1)th stamper 500 is used with a transfer layer 503 formed on the guide grooves and pits shown in FIG. 14(a). The transfer layer is formed using the method shown in FIGS. 5(a) and 5(b). A kth signal substrate 306 is warped so as to wrap around the kth signal recording layer. Warpage measuring means 1401 calculates an angle of inclination of the kth signal recording layer on the kth signal substrate by causing measuring light 1402 to enter the kth signal recording layer on the kth signal substrate 306 and detecting the position of the reflected measuring light 1402.

As shown in FIG. 14(b), the shape maintaining arm 1400 maintains the surface opposite to the surface on which the transfer layer 503 of the (k−1)th stamper 500 is formed to the inside radius side and the outside radius side. At this time, the shape maintaining arm 1400 maintains the (k−1)th stamper 500 in a warped position so that guide grooves and pits of the (k−1)th signal recording layer are kept parallel to the kth signal recording layer according to the angle of inclination of the kth signal recording layer obtained from the warpage measuring means 1401. That is, the warpage measuring means 1401 measures the surface shape of the kth signal recording layer of one or a plurality of the kth signal substrates 306 manufactured currently or in the past and the shape maintaining arm 1400 shapes the surface with the guide grooves and/or pits of the (k−1)th signal recording layer of the (k−1)th stamper 500 in such a way as to conform to the surface shape of the kth signal substrate 306 based on the measurement result. That is, the shape maintaining arm 1400 forms the (k−1)th stamper 500 in a shape parallel to the shape of the kth signal substrate 306 based on the measurement result.

Then, the shape of the kth signal substrate 306 may be measured by measuring the shape of the kth signal substrate 306 manufactured first in the morning the day before when the plant operates and determining the shape of the (k−1)th stamper 500 based on the measurement result. Furthermore, it is also possible to measure the shape of the kth signal substrates 306 one by one every time the kth signal substrate 306 is manufactured and determine the shape of the (k−1)th stamper 500 based on the measurement result. Furthermore, it is also possible to determine the shape of the (k−1)th stamper 500 using the measurement result of the shape of the kth signal substrate 306 for each lot.

In order to change the shape of the (k−1)th stamper 500, the member which holds the stamper of the shape maintaining arm 1400 has driving means such as an air cylinder, stepping motor and actuator, etc. Furthermore, the holding method includes vacuum suction and a mechanical holding method such as a lug in the case of the outside radius side.

Then, as shown in FIG. 14(c), with the shape of the (k−1)th stamper 500 maintained, adhesive layer UV cure resin 307 which becomes part of the (k−1)th separation layer is applied in the space with the kth signal substrate 306. The nozzle 1403 is inserted between the (k−1)th stamper 500 and the kth signal substrate 306 and adhesive layer UV cure resin 307 is dribbled in the inside radius area of the kth signal substrate 306. At this time, the kth signal substrate 306 is held on the table 309 and the adhesive layer UV cure resin 307 is dribbled like a ring when the table 309 is turned. Since the (k−1)th stamper 500 is held by the shape maintaining arm 1400, the distance from the kth signal substrate 306 can be kept uniform in the radial direction.

Then, while the shape of the (k−1)th stamper 500 is maintained by the shape maintaining arm 1400, the table 309 which holds the kth signal substrate 306 is turned. At this time, the shape maintaining arm 1400 also rotates in synchronization with the table 309 while holding the (k−1)th stamper 500. Through this rotation, the adhesive layer UV cure resin 307 spreads in the radial direction and forms a uniform adhesive layer between the (k−1)th stamper 500 and the kth signal substrate 306. With the shape of the (k−1)th stamper 500 maintained by the shape maintaining arm 1400, the adhesive layer is cured by UV rays and peeling is performed as shown in FIGS. 6(a)-6(d). The lug 610 in FIGS. 6(a)-6(d) and the handling means 612 constitute part of the peeling means.

Furthermore, when the kth signal substrate is warped so as to wrap around the surface opposite to the surface on which the kth signal recording layer is placed, the shape maintaining arm 1400 holds the (k−1)th stamper 500 as shown in FIG. 14(d).

FIGS. 15(a)-15(d) show cases where the shape maintaining means has a table shape. A flat (k−1)th stamper 500 with a transfer layer 503 formed on guide grooves and pits shown in FIG. 15(a) is used. The transfer layer is formed using the method shown in FIGS. 5(a) and 5(b). The kth signal substrate 306 is warped so as to wrap around the kth signal recording layer. The warpage measuring means 1401 calculates an angle of inclination of the kth signal recording layer on the kth signal substrate by causing measuring light 1402 to enter the kth signal recording layer on the kth signal substrate 306 and detecting the position of the reflected measuring light 1402.

As shown in FIG. 15(b), the shape maintaining table 1500 holds the surface of the (k−1)th stamper 500 on which the transfer layer 503 is formed. At this time, the shape maintaining table 1500 holds the (k−1)th stamper 500 warped so that guide grooves and pits of the (k−1)th signal recording layer are kept parallel to the kth signal recording layer according to the angle of inclination of the kth signal recording layer obtained from the warpage measuring means 1401. That is, according to the angle of inclination of the kth signal recording layer, either a convex shape maintaining table 1500 which shapes the (k−1)th stamper 500 so as to wrap around the surface opposite to the surface provided with guide grooves and pits as shown in FIG. 15(b) or a concave shape maintaining table 1501 which shapes the (k−1)th stamper 500 so as to wrap around the surface provided with guide grooves and pits as shown in FIG. 15(d) is selected and the (k−1)th stamper 500 is held. Furthermore, the holding method includes vacuum suction and a mechanical holding method such as a lug in the case of the outside radius side.

Then, as shown in FIG. 15(c), with the shape of the (k−1)th stamper 500 maintained, adhesive layer UV cure resin 307 which becomes part of the (k−1)th separation layer is applied in the space with the kth signal substrate 306. The nozzle 1403 is inserted between the (k−1)th stamper 500 and the kth signal substrate 306 and adhesive layer UV cure resin 307 is dribbled in the inside radius area of the kth signal substrate 306. At this time, the kth signal substrate 306 is held on the table 309 and the adhesive layer UV cure resin 307 is dribbled like a ring when the table 309 is turned. Since the (k−1)th stamper 500 is held by the shape maintaining table 1500, the distance from the kth signal substrate 306 can be kept uniform in the radial direction.

Then, while the shape of the (k−1)th stamper 500 is maintained by the shape maintaining table 1500, the table is turned. Through this rotation, the adhesive layer UV cure resin 307 spreads in the radial direction and forms a uniform adhesive layer between the (k−1)th stamper 500 and the kth signal substrate 306. With the shape of the (k−1)th stamper maintained by the shape maintaining table 1500, the adhesive layer is cured by UV rays and peeling is performed as shown in FIGS. 6(a)-6(d). The lug 610 in FIGS. 6(a)-6(d) and the handling means 612 constitute part of the peeling means.

FIG. 15(c) has shown the method of inserting the nozzle 1403 between the kth signal substrate 306 and the (k−1)th stamper 500 and dribbling the adhesive layer UV cure resin 307, but it is also possible to dribble the adhesive layer UV cure resin 307 directly onto the (k−1)th stamper using the nozzle and then drop the kth signal substrate on top of it. These two types of dribbling method can also be used in the steps in FIG. 3(c).

Embodiment 5 has described the method of forming the (k−1)th separation layer from two types of material of the adhesive layer using the transfer layer and UV cure resin, but Embodiment 5 is also applicable when the (k−1)th separation layer other than the transfer layer exists on the kth signal substrate. For example, this embodiment is applicable to a method of dribbling a material which becomes a transfer layer on a pressure-sensitive adhesive which exists on the kth signal substrate.

Furthermore, Embodiment 5 has described the method of changing the shape of the (k−1)th stamper by the shape maintaining means according to the shape (warpage) of the kth signal substrate having a plurality of signal recording layers, but it is also possible to change the shape of kth signal substrate. Changing the shape generally distorts a plurality of signal recording layers, and therefore it is preferable to change the shape of the (k−1)th stamper.

Embodiment 5 has used the plastic (k−1)th stamper of 1.1 mm in thickness, but any plastic stamper that has a thickness of at least about 0.5 mm is acceptable. If the stamper has a thickness of about 0.5 mm or more, since it also has rigidity, its shape can be easily controlled according to the molding condition using the injection molding method and it can be easily handled, which is suited to improving productivity. Furthermore, the metal stamper shown in Embodiment 4 can also be used instead of the plastic (k−1)th stamper.

Furthermore, Embodiment 5 has described the case where the plastic (k−1)th separation layer is made of two materials, but this embodiment is also applicable to a case where the (k−1)th separation layer is made of three or more materials. Furthermore, Embodiment 5 has been described using UV cure resin, but it is also possible to use a radiation cure, material including a heat cure material.

As described above, the method of manufacturing the multilayer optical information recording medium of the present invention forms the (k−1)th separation layer by maintaining the kth signal recording layer of the kth signal substrate and the surface provided with guide grooves or pits or guide grooves and pits of the (k−1)th stamper in a shape parallel to each other, and can thereby keep constant the distance between the kth signal recording layer of the kth signal substrate and the surface provided with guide grooves or pits or guide grooves and pits of the (k−1)th stamper and keep uniform the thickness of the (k−1)th separation layer formed.

The invention claimed is:

1. A method of manufacturing a multilayer optical information recording medium comprising:
   providing a substrate having a central hole and a surface, wherein the substrate comprises at least one signal recording layer(s) and wherein one of the at least one signal recording layer(s) is provided on the surface of the substrate,
   fixing said substrate to a support base having a central hole configured to allow air to flow therethrough,
   measuring a surface shape of one or a plurality of said substrates,
   shaping a stamper such that the stamper is provided with (1) guide grooves and/or pits corresponding to an additional signal recording layer, (2) a central hole, and (3) a shape which corresponds to said measured surface,
   forming a separation layer having a central hole by providing a material between the stamper and the substrate such that the separation layer separates the signal recording layer provided on the surface of the substrate from the additional signal recording layer provided on the stamper,
   attaching a handling means to the stamper, and
   peeling the stamper from the separation layer by (1) inserting a lug into the central holes of the separation layer and the stamper, (2) introducing pressurized air from the central hole of the support base while opening the lug outward, and (3) pulling up the handling means.

2. The method of manufacturing the multilayer optical information recording medium according to claim 1, wherein:
   the one of the at least one recording layer(s) provided on the surface of the substrate faces away From the support base, and
   a surface of the stamper provided with the guide grooves and/or pits faces the support base.

3. The method of manufacturing the multilayer optical information recording medium according to claim 2, wherein:
   said one of said substrates is warped away from the support base, and
   said stamper is warped away from the support base.

4. The method of manufacturing the multilayer optical information recording medium according to claim 2, wherein:
   said one of said substrates is warped toward the support base, and
   said stamper is warped toward the support base.

5. The method of manufacturing the multilayer optical information recording medium according to claim 3 or 4, wherein in said forming step, the one of the at least one signal recording layers provided on the surface of the substrate and the surface of the stamper provided with the guide grooves and/or pits are shaped so as to have substantially the same radius of curvature.

6. The method of manufacturing the multilayer optical information recording medium according to claim 1, wherein said separation layer is radiation cure resin.

7. The method of manufacturing the multilayer optical information recording medium according to claim 6, wherein said radiation cure resin is UV cure resin.

8. The method of manufacturing the multilayer optical information recording medium according to claim 1, wherein said separation layer consists of a plurality of layers.

9. The method of manufacturing the multilayer optical information recording medium according to claim 8, wherein:
   one of the plurality of layers of said separation layer, which contacts the surface of the stamper provided with the guide grooves and/or pits, is a transfer layer, and
   an interface between said transfer layer and said stamper is an interface which is most easily peeled off.

10. The method of manufacturing the multilayer optical information recording medium according to claim 9, wherein at least said transfer layer is a radiation cure material.

11. The method of manufacturing the multilayer optical information recording medium according to claim 10, wherein said radiation cure material is UV cure resin.

12. The method of manufacturing the multilayer optical information recording medium according to claim 11, wherein the viscosity of said UV cure resin is about 1 to 1000 mPa·s.

13. The method of manufacturing the multilayer optical information recording medium according to claim 8, wherein:
   one of the plurality of layers of said separation layer, which contacts the surface of the stamper provided with the guide grooves and/or pits, is a transfer layer, and
   at least one of said plurality of layers of said separation layer other than the transfer layer is a pressure-sensitive adhesive.

14. The method of manufacturing the multilayer optical information recording medium according to claim 13, wherein said pressure-sensitive adhesive is superimposed gradually starting from a central area outward in a chamber vacuum-sealed in the degree of 1 to 100 hPa and then pressed by a high-pressure compressed air to secure the adhesion.

15. The method of manufacturing the multilayer optical information recording medium according to claim 8, wherein the forming step further includes:
   coating the surface of the stamper provided with the guide grooves and/or pits with a radiation cure material which becomes a transfer layer of the plurality of layers of the separation layer;
   curing the radiation cure material;
   forming at least one other layer of the plurality of layers of the separation layer on the one of the at least one signal recording layer(s) provided on the surface of the substrate; and
   attaching the transfer layer to the at least one other layer of the plurality of layers of the separation layer.

16. The method of manufacturing the multilayer optical information recording medium according to claim 15, wherein the at least one other layer of the plurality of layers of the separation layer is a radiation cure material.

17. The method of manufacturing the multilayer optical information recording medium according to claim 8, wherein the forming step further includes:

forming at least one of the plurality of layers of the separation layer on the one of the at least one signal recording layer(s) provided on the surface of the substrate;

disposing a radiation cure material between said stamper and the at least one of the plurality of layers of the separation layer; and curing the radiation cure material to form a transfer layer of the plurality of layers of the separation layer.

18. The method of manufacturing the multilayer optical information recording medium according to claim 17, wherein the disposing step further includes applying the radiation cure material to the at least one of the plurality of layers of the separation layer cure.

19. The method of manufacturing the multilayer optical information recording medium according to claim 15, wherein said stamper is held in such a way that said stamper is shaped parallel to said one of the at least one signal recording layer(s) and then said radiation cure material is cured.

20. The method of manufacturing the multilayer optical information recording medium according to claim 2, wherein said stamper is made of plastic.

21. The method of manufacturing the multilayer optical information recording medium according to claim 20, wherein said plastic is transparent.

22. The method of manufacturing the multilayer optical information recording medium according to claim 21, wherein said stamper is any one of polycarbonate, olefin resin, acrylic resin or norbornen-based resin.

23. The method of manufacturing the multilayer optical information recording medium according to claim 22, wherein said stamper is formed by injection molding so as to be shaped parallel to said substrate.

24. The method of manufacturing the multilayer optical information recording medium according to claim 23, wherein the shaping step further includes;

disposing a master stamper on a first metal die mirrored surface;

disposing a polycarbonate material between the first metal die mirrored surface and a second metal die mirrored surface, setting a temperature of the second metal die mirrored surface higher than a temperature of the master stamper, thereby to form a warped stamper which, when placed so that the surface of the stamper provided with the guide grooves and/or pits faces the table, warps away from the table.

25. The method of manufacturing the multilayer optical information recording medium according to claim 24, wherein the shaping step further comprises setting the temperature of the second metal die mirrored surface higher than a temperature of the first metal die mirrored surface.

26. The method of manufacturing the multilayer optical information recording medium according to claim 24, wherein cooling water channels are provided with both of upper and lower sides of the first metal die mirrored surface, and a heat insulator is placed on a back surface of the second metal die mirrored surface.

27. The method of manufacturing the multilayer optical information recording medium according to claim 23, wherein the shaping step further includes:

disposing a master stamper on a first metal die mirrored surface;

disposing a polycarbonate material between the first metal die mirrored surface and a second metal die mirrored surface; and setting a temperature of the master stamper higher than a temperature of the second metal die mirrored surface, thereby to form a warped stamper which, when placed so that the surface of the stamper provided with the guide grooves and/or pits faces the table, warps toward the table.

28. The method of manufacturing the multilayer optical information recording medium according to claim 27, wherein the shaping step further comprises setting a temperature of the first metal die mirrored surface higher than the temperature of the second metal die mirrored surface.

29. The method of manufacturing the multilayer optical information recording medium according to claim 27, wherein a heat insulator is placed on at least one of a back surface of said metal master stamper and a back surface of the first metal die mirrored surface.

30. The method of manufacturing the multilayer optical information recording medium according to claim 1, wherein said stamper is metal.

31. The method of manufacturing the multilayer optical information recording medium according to claim 30, wherein in said shaping step:

said stamper is created by electrocasting;

said substrate and said stamper are arranged with said one of said at least one signal recording layers and the surface of the stamper provided with the guide grooves and/or pits facing each other under at least one electrocasting condition of a pH value, a temperature and a current density of an electrocasting bath during electrocasting, said stamper is controlled so as to be shaped parallel to said substrate.

32. The method of manufacturing the multilayer optical information recording medium according to claim 1, further comprising a film forming step after said peeling step, of completing an additional one of the at least one signal recording layer(s) by forming one of a recording multilayer film or a reflecting film on the guide grooves and/or pits of said additional signal recording layer.

33. The method of manufacturing the multilayer optical information recording medium according to claim 1, wherein:

the forming step further comprises forming a recording multilayer film or a reflecting film on the surface of the stamper provided with the guide grooves and/or pits, and said peeling step, further comprises peeling off said stamper from an interface formed between said recording multilayer film and said stamper, wherein said recording multilayer film or said reflecting film is moved onto said separation layer.

34. The method of manufacturing the multilayer optical information recording medium according to claim 1, wherein a transparent cover layer is formed on the one of the at least one signal recording layer(s).

35. The method of manufacturing the multilayer optical information recording medium according to claim 34, wherein said transparent cover layer is formed by adhering a transparent substrate to the one of the at least one signal recording layer(s) with a transparent adhesive.

36. The method of manufacturing the multilayer optical information recording medium according to claim 34, wherein said transparent cover layer is formed of a transparent radiation cure material.

37. The method of manufacturing the multilayer optical information recording medium according to claim 34, wherein at least part of said transparent cover layer is formed of a pressure-sensitive adhesive.

38. The method of manufacturing the multilayer optical information recording medium according to claim 34, wherein the thickness of the transparent cover layer is 0.3 mm or less.

39. An apparatus for manufacturing a multilayer optical information recording medium having a central hole comprising:
- a support base comprising a central hole for fixing a substrate having a central hole such that the central holes of the support base and the substrate are superimposed, wherein the substrate comprises at least one signal recording layer(s) and wherein one of the at least signal recording layer(s) is provided on a surface of the substrate,
- measuring means for measuring a surface shape of one or a plurality of the substrates,
- a shaping means for providing the stamper with (1) guide grooves and/or pits corresponding to an additional signal recording layer, (2) a central hole, and (3) a shape which corresponds to said measured surface,
- forming means for producing a separation layer having a central hole by providing a material between the stamper and the substrate such that the separation layer separates the signal recording layer provided on the surface of the substrate from the additional signal recoding layer provided on the stamper, and
- peeling means comprising (1) a lug which is inserted into the central holes of the separation layer and the stamper, wherein the lug can be opened outwardly, (2) a source or pressurized air which delivers pressurized air to the central hole of the support base while the lug is opened outwardly, and (3) a handling means which attaches to the stamper such that it may be pulled up to peel the stamper from the separation layer.

40. The apparatus of manufacturing the multilayer optical information recording medium according to claim 39, wherein the shaping means comprises a mechanism which holds the stamper so that when the substrate is warped, the guide grooves and/or pits of the additional signal recording layer and the one of the at least one signal recording layer are parallel to each other according to the warpage of the substrate.

41. The apparatus of manufacturing the multilayer optical information recording medium according to claim 40, wherein the shaping means has a shape of a round-table and has a surface shape that contacts the stamper so that the guide grooves and/or pits of the additional signal recording layer are parallel to the one of the at least one signal recording layer.

42. The apparatus of manufacturing the multilayer optical information recording medium according to claim 39, wherein the shaping means supports the surface of at least one of the stamper and the signal substrate for which the additional separation layer is not formed by "vacuum suction".

* * * * *

UNITED STATES PATENT AND TRADEMARK OFFICE
CERTIFICATE OF CORRECTION

| | |
|---|---|
| PATENT NO. | : 7,497,916 B2 |
| APPLICATION NO. | : 10/486764 |
| DATED | : March 3, 2009 |
| INVENTOR(S) | : Kazuhiro Hayashi et al. |

It is certified that error appears in the above-identified patent and that said Letters Patent is hereby corrected as shown below:

<u>Column 31</u>

At claim 2, line 49, "From" should read -- from --.

<u>Column 34</u>

At claim 33, line 46, "step," should read -- step --.

Signed and Sealed this

Twenty-third Day of June, 2009

JOHN DOLL
*Acting Director of the United States Patent and Trademark Office*